(12) United States Patent
Ohashi

(10) Patent No.: US 6,839,183 B2
(45) Date of Patent: Jan. 4, 2005

(54) ZOOM LENS, CAMERA, AND PORTABLE INFORMATION TERMINAL DEVICE

(75) Inventor: Kazuyasu Ohashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/458,225

(22) Filed: Jun. 11, 2003

(65) Prior Publication Data

US 2004/0008420 A1 Jan. 15, 2004

(30) Foreign Application Priority Data

Jun. 11, 2002 (JP) ........................................ 2002-170717

(51) Int. Cl.[7] .............................................. G02B 15/14
(52) U.S. Cl. ...................................... 359/689; 359/682
(58) Field of Search ................................ 359/689, 691, 359/686–687, 683, 676, 680–682, 692

(56) References Cited

U.S. PATENT DOCUMENTS

| | | | |
|---|---|---|---|
| 5,153,779 A | 10/1992 | Ohashi | ........................ 359/770 |
| 5,398,135 A | 3/1995 | Ohashi | ........................ 359/692 |
| 5,576,891 A | 11/1996 | Ohashi | ........................ 359/692 |
| 5,581,319 A | 12/1996 | Ohashi | ........................ 396/374 |
| 5,617,254 A | 4/1997 | Ohashi | ........................ 359/692 |
| 5,630,188 A | 5/1997 | Ohashi | ........................ 396/385 |
| 5,687,401 A | 11/1997 | Kawamura et al. | ........... 396/79 |
| 5,745,301 A | * 4/1998 | Betensky et al. | ........... 359/689 |
| 5,930,056 A | 7/1999 | Ohashi | ........................ 359/776 |
| 6,122,111 A | * 9/2000 | Neil et al. | ................... 359/689 |
| 6,163,410 A | * 12/2000 | Nagaoka | ..................... 359/654 |
| 6,353,506 B1 | 3/2002 | Ohashi | ........................ 359/687 |
| 6,525,885 B2 | 2/2003 | Ohashi | ........................ 359/690 |
| 2002/0060855 A1 | 5/2002 | Ohashi | ........................ 359/684 |
| 2002/0101665 A1 | 8/2002 | Ohashi et al. | ............... 359/691 |

FOREIGN PATENT DOCUMENTS

| | | |
|---|---|---|
| JP | 10-39214 | 2/1998 |
| JP | 11-287953 | 10/1999 |
| JP | 2001-296476 | 10/2001 |

* cited by examiner

*Primary Examiner*—Jordan M. Schwartz
(74) *Attorney, Agent, or Firm*—Oblon, Spivak, McClelland, Maier & Neustadt, P.C.

(57) ABSTRACT

A zoom lens includes a negative first group optical system, and a positive second group optical system, which are sequentially arranged from an object side, and an aperture stop disposed on the object side of the second group optical system moving integrally therewith. During change of magnification from a short focal end to a long focal end, the second group optical system monotonously moves from the image side to the object side, and the first group optical system moves so as to correct displacement of an image plane position in accordance with the change of magnification.

15 Claims, 15 Drawing Sheets

FIG.7
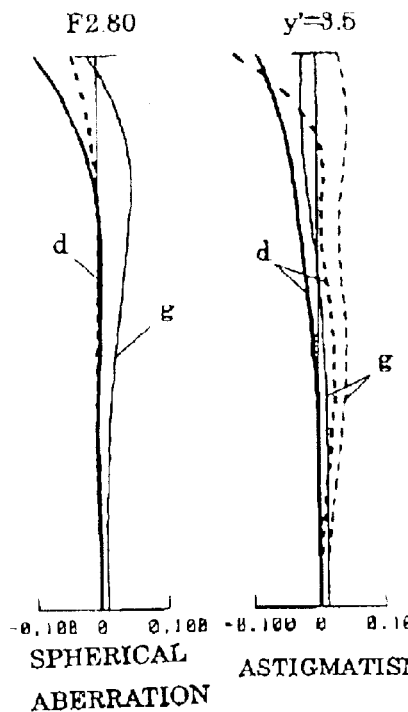
SPHERICAL ABERRATION
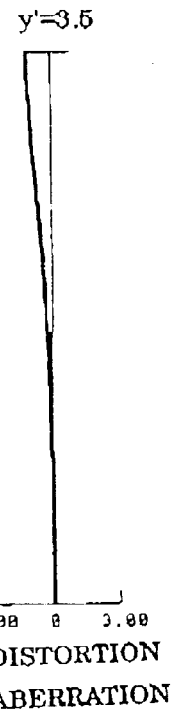
ASTIGMATISM
DISTORTION ABERRATION
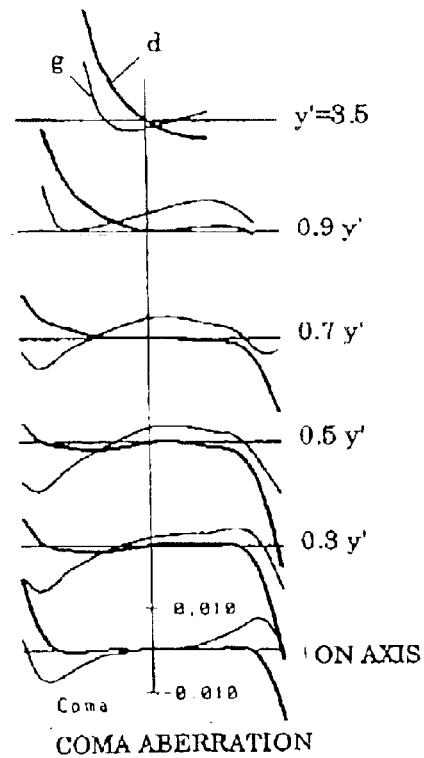
COMA ABERRATION
FIG.8
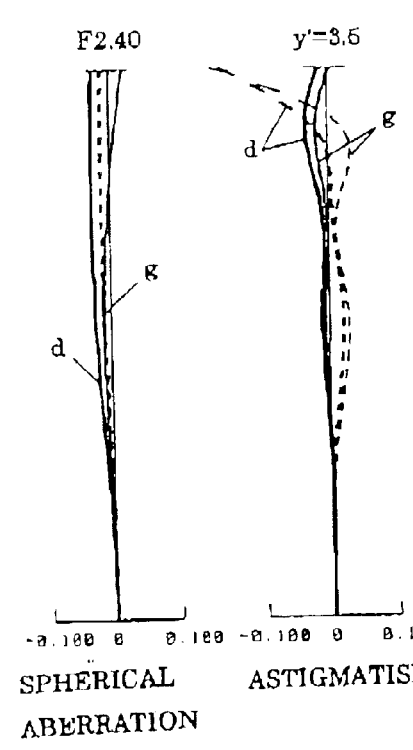
SPHERICAL ABERRATION
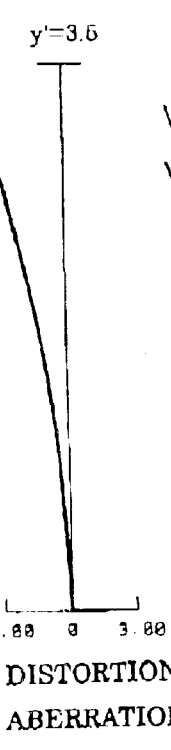
ASTIGMATISM
DISTORTION ABERRATION
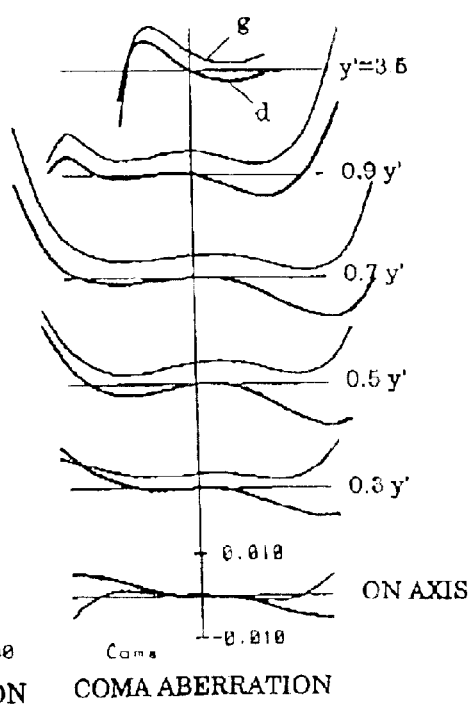
COMA ABERRATION

SPHERICAL ABERRATION  ASTIGMATISM  DISTORTION ABERRATION  COMA ABERRATION

SPHERICAL ABERRATION  ASTIGMATISM  DISTORTION ABERRATION  COMA ABERRATION

FIG.15
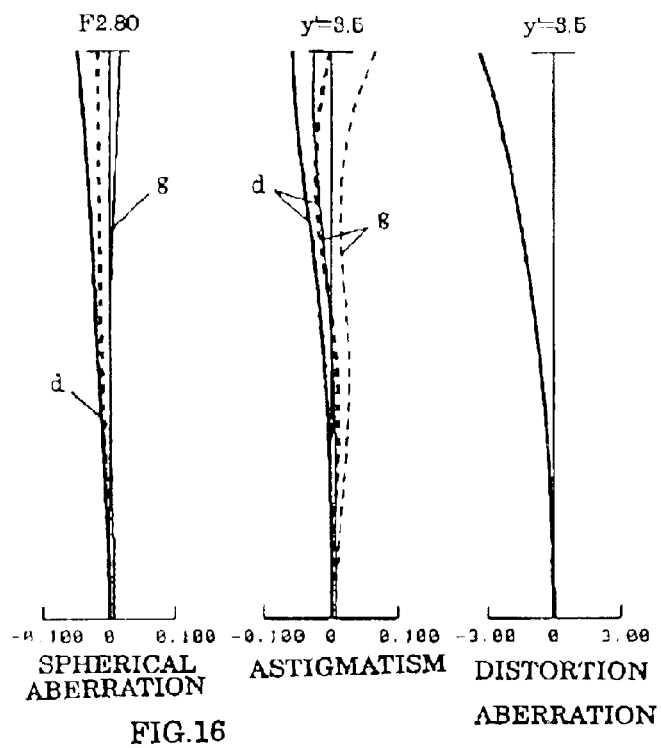
SPHERICAL ABERRATION | ASTIGMATISM | DISTORTION ABERRATION
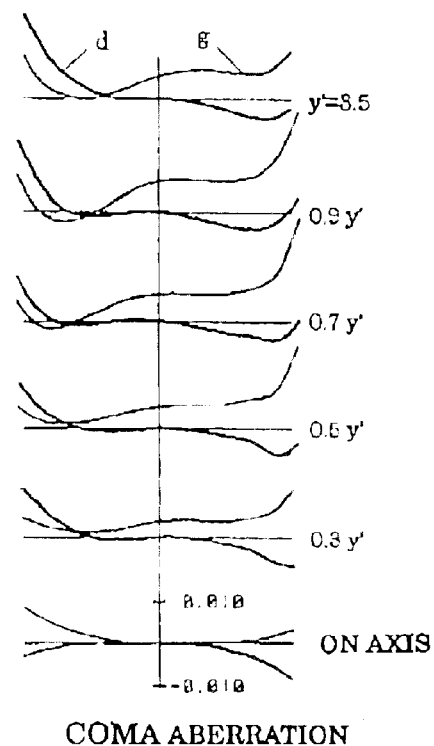
COMA ABERRATION
FIG.16
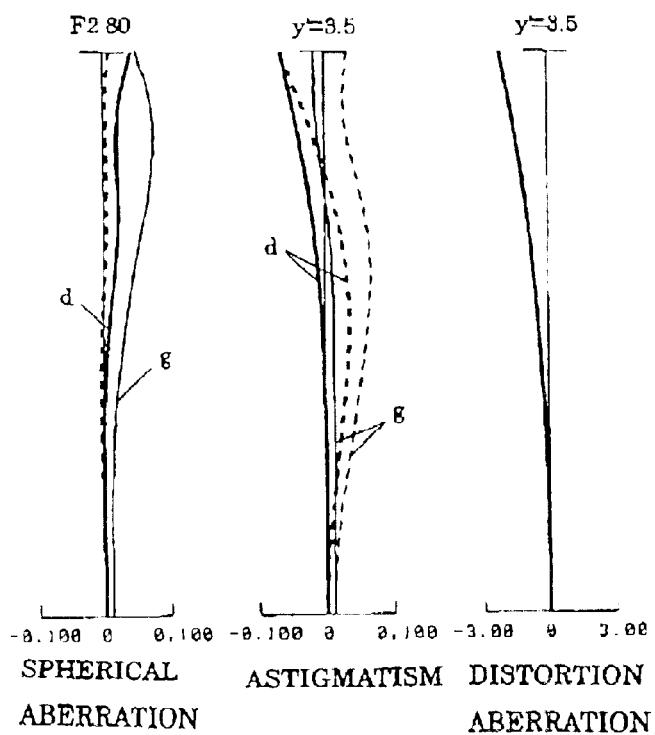
SPHERICAL ABERRATION | ASTIGMATISM | DISTORTION ABERRATION
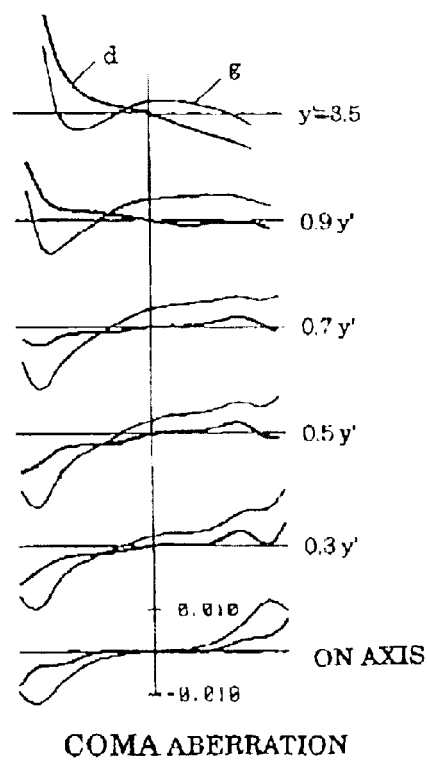
COMA ABERRATION

ZOOM LENS, CAMERA, AND PORTABLE INFORMATION TERMINAL DEVICE

BACKGROUND OF THE INVENTION

1. Field of the Invention

The present invention relates to improvement in a zoom lens used as a photography optical system for a variety of cameras including a so-called silver camera, and more particularly, to a zoom lens suitable for cameras such as a digital camera and a video camera, and a camera and a portable information terminal device using such a zoom lens.

2. Description of the Prior Art

In recent years, instead of a conventional camera using a silver film, i.e., a sliver camera, there has been rapidly known a camera of such type referred to as a digital camera, an electronic camera or the like, which photographs an image of a subject (object) by a solid-state imaging device such as a CCD (charge coupled device), thereby acquiring image data such as a static image (still image) or a motion image (movie image) of the object and digitally recording the data in a nonvolatile semiconductor memory represented by a flash memory.

A market for such a digital camera is very large, and the user demands for the digital camera have been ranged in scope. In particular, high image quality and miniaturization of a digital camera are always the user's demand, and are of large interest of the user. Therefore, compatibility of high performance and miniaturization is requested for a zoom lens used as a photographing lens.

On the other hand, it is desirable that a photographing lens mounted on a camera is as bright as possible, i.e., capable of capturing a large amount of light. In particular, in the case of a zoom lens, a telephoto end is prone to darker than a wide angle end, and it is desired to ensure brightness at the telephoto end. This is because of the absence of sufficient brightness at the telephoto end delays a shutter speed at the telephoto end, and causes a motion of hands or a motion of an object.

On the other hand, if such insufficient brightness is compensated for by an increase of gain of an imaging device, it causes higher noise.

In addition, there is another problem that, if there is a significant change of brightness in accordance with zooming from a wide-angle end to a telephoto end, exposure control during monitoring using a display element becomes complicated. For example, in the case where zooming from the wide angle to the telephoto end is carried out while in monitoring, if there is no change of brightness of a lens in accordance with zooming, there is no unnaturalness even if exposure control is not carried out while in zooming.

However, in the case where a lens is darkened at the telephoto end, if no exposure control is carried out while in zooming, a monitor image is gradually darkened. Thus, it is desirable to provide a zoom lens in which there is a small change of brightness in accordance with zooming from the wide-angle end to the telephoto end.

There are various types of zoom lenses used for a photographing lens of a digital camera. A zoom lens of such type suitable for miniaturization is characterized by including: a first group optical system having a negative focal length, a second group optical system having a positive focal length, and a third group optical system having a positive focal length, which are sequentially arranged in this order from an object side; and a aperture stop which is disposed on the object side of the second group optical system and moves integrally with the second group optical system, wherein, in change of magnification from a short focal end to a long focal end, the second group optical system monotonously moves from the image side to the object side, and the first group optical system moves so as to correct displacement of an image plane position in accordance with the change of magnification.

A zoom lens of such a type is disclosed in Japanese Patent Laid-open (JP-L) Nos. 10-39214, 11-287953, and 2001-296476 or the like, for example.

Among them, the above zoom lens of such type disclosed in JP-L No. 10-39214 was filed at the earliest time, and a basic construction of the above zoom lens of such type is all disclosed. In addition, in each of JP-L Nos. 11-287953 and 2001-296476, there is disclosed an improved zoom lens which is an improvement in the previous zoom lens disclosed in JP-A No. 11-287953, and is a miniaturization of the previous zoom lens.

However, all of the zoom lenses disclosed as embodiments or specific examples in the above described JP-L Nos. 10-39214, 11-287953, and 2001-296476 have a disadvantage that they cannot acquire sufficient brightness at a telephoto end, and include a significant change of brightness in accordance with zooming from the wide-angle end to the telephoto end.

For example, in Example 1 of JP-L No. 10-39214, "F/No. (F number)=2.5 to 4.4 when "f(focal length)=4.6 mm to 14.6 mm" is described. Namely, the brightness in a state in which the focal length "f" is the longest, 14.6 mm, namely, the F number is 4.4, which is not sufficiently bright. In addition, a change of F number is in the range of 2.5 to 4.4, and a change of brightness is significant.

Similarly, in Example 2 of JP-A No. 10-39214, "F/No.= 2.4 to 4.3" when "f=4.6 mm to 14.0 mm" is described, and in Example 3 thereof, "F/No.=2.5 to 4.8" when "f=4.5 mm to 15.0 mm" is described, respectively. The brightness, in a state in which a telephoto end, namely, a focal length "f" is the longest, 14.0, and 15.0 mm, namely, the F number is 4.3 and 4.8, which is not sufficiently bright. In addition, a change of F number is in the range of 2.4 to 4.3 and in the range of 2.5 to 4.8, a change of brightness is also significant.

SUMMARY OF THE INVENTION

The present invention has been made in view of the aforementioned circumstance. It is an object of the present invention to provide a zoom lens, a camera, and a portable information terminal having at least a first group optical system having a negative focal length and a second optical system having a positive focal length sequentially arranged in this order from an object side, the zoom lens, camera, and terminal having an aperture stop which moves integrally with the second group optical system, wherein, during change of magnification from a short focal end to a long focal end, the second group optical system monotonously moves from the image side to the object side; and the first group optical system moves so as to correct displacement of an image plane position in accordance with the change of magnification, so that the sufficient brightness at a telephoto end can be acquired while the zoom lens is maintained in a sufficiently small size and high performance; and moreover, a change of brightness in accordance with zooming from the wide angle end to the telephoto end can be reduced.

An object of a first aspect of the present invention, in particular, is to provide a zoom lens including: at least a first group optical system having a negative focal length and a second optical system having a positive focal length, which are sequentially arranged in this order from an object side; and an aperture stop which moves integrally with the second group optical system sequentially, wherein, during change of magnification from a short focal end to a long focal end, the second group optical system monotonously moves from the image side to the object side, and the first group optical system moves so as to correct displacement of an image plane position in accordance with the change of magnification, so that a change of brightness in accordance with zooming from the wide range end to the telephoto end can be efficiently reduced while maintaining sufficiently small size and high performance of the lens.

An object of a second aspect of the present invention, in particular, is to provide a zoom lens including: at least a first group optical system having a negative focal length and a second group optical group having a positive focal length, which are sequentially arranged in this order from an object side; and an aperture stop which moves integrally with the second optical group, wherein, during change of magnification from a short focal end to a long focal end, the second group optical system monotonously moves from the image side to the object side, and the first group optical system moves so as to correct displacement of an image plane position in accordance with the change of magnification, so that a change of brightness in accordance with zooming from the wide angle end to the telephoto end can be effectively reduced while maintaining sufficiently small size and high performance of the lens.

An object of a third aspect of the present invention, in particular, is to provide a zoom lens including: a first group optical system having a negative focal length, a second group optical system having a positive focal length, and a third group optical system having a positive focal length, which are sequentially arranged in this order from an object side; and an aperture stop which is disposed on the object side of the second group optical system and moves integrally with the second group optical system, wherein, during change of magnification from a short focal end to a long focal end, the second group optical system monotonously moves from the image side to the object side, and the first group optical system moves so as to correct displacement of an image plane position in accordance with the change of magnification, so that a change of brightness in accordance with zooming from the wide angle end to the telephoto end can be effectively reduced while maintaining sufficiently small size and high performance of the lens.

An object of a fourth aspect of the present invention, in particular, is to provide a zoom lens including: a first group optical system having a negative focal length, a second group optical system having a positive focal length, and a third group optical system having a positive focal length, which are sequentially arranged in this order from an object side; and an aperture stop which is disposed on the object side of the second group optical system and moves integrally with the second group optical system, wherein, during change of magnification from a short focal end to a long focal end, the second group optical system monotonously moves from the image side to the object side, and the first group optical system moves so as to correct displacement of an image plane position in accordance with the change of magnification, so that a change of brightness in accordance with zooming from the wide angle end to the telephoto end can be efficiently reduced while maintaining sufficiently small sized and high performance of the lens, and sufficient brightness even at the telephoto end.

An object of a fifth aspect of the present invention, in particular, is to provide a zoom lens including: a first group optical system having a negative focal length, a second group optical system having a positive focal length, and a third group optical system having a positive focal length, which are sequentially arranged in this order from an object side; and an aperture stop which moves integrally with the second group optical system, wherein, during change of magnification from a short focal end to a long focal end, the second group optical system monotonously moves from the image side to the object side, and the first group optical system moves so as to correct displacement of an image plane position in accordance with the change of magnification, so that a change of brightness in accordance with zooming from the wide angle end to the telephoto end can be efficiently reduced while maintaining sufficiently small sized and high performance of the lens, and sufficient brightness even at the telephoto end.

An object of a sixth aspect of the present invention, in particular, is to provide a zoom lens recited in the above first to fourth aspects, capable of acquiring sufficient brightness even at a telephoto end while maintain sufficiently small size and high performance of the lens.

An object of a seventh aspect of the present invention, in particular, is to provide a zoom lens recited in the above first to sixth aspects in which brightness does not change in a middle focal length region or even if the brightness changes, such change can be sufficiently smoothened.

An object of an eighth aspect of the present invention, in particular, is to provide a zoom lens recited in the above first to sixth aspects, capable of making brightness in a middle focal length region sufficiently constant or control the brightness with sufficient smoothness.

An object of a ninth aspect of the present invention, in particular, is to provide a zoom lens recited in the above third to fifth aspects, capable of achieving high performance with a simple construction.

An object of a tenth aspect of the present invention, in particular, is to provide a zoom lens recited in the ninth aspect, capable of further achieving high performance.

An object of an eleventh aspect of the present invention, in particular, is to provide a zoom lens recited in the above first to sixth aspects, which is further small sized, and moreover, is capable of achieving high performance An object of a twelfth aspect of the present invention, in particular, is to provide a zoom lens recited in the eleventh aspect, capable of further achieving high performance.

An object of a thirteenth aspect of the present invention, in particular, is to provide a camera lens in which, as described in any one of the above first to twelfth aspects, a zoom lens which is sufficiently small sized and has high performance, and which achieves at least establishment of sufficient brightness at a telephoto end and reduction of change of brightness in accordance with zooming from the wide angle end to the telephoto end, is used as a photography optical system, thereby making it possible to achieving miniaturization and high image quality.

An object of a fourteenth aspect of the present invention, in particular, is to provide a portable information terminal device in which, as described in any one of the above first to twelfth aspects, a zoom lens which is sufficiently small sized and has high performance, and which achieves at least establishment of sufficient brightness at a telephoto end and reduction of change of brightness in accordance with zooming from the wide angle end to the telephoto end, is used as a photography optical system of a camera function section, thereby making it possible to achieving miniaturization and high image quality.

In order to achieve the above described object the zoom lens according to the present invention demented in the first aspect is characterized by including: a first group optical system having a negative focal length and a second group optical system having a positive focal length, which are sequentially arranged in this order from an object aide; and an aperture stop which moves integrally wit the second group optical system, wherein, during change of magnification from a short focal end to a long focal end, the second group optical system monotonously moves from the image side to the object side, and the first group optical system moves so as to correct displacement of an image plane position in accordance with the change of magnification, and the following conditional formula is satisfied:

$$0.9 < F_T/F_W < 1.2$$

where a minimum F number at a wide angle end is FW, and a minimum F number at a telephoto end is FT.

In order to achieve the above described object, the zoom lens according to the present invention described in the second aspect is characterized by including a first group optical system having a negative focal length and a second group optical system having a positive focal length, which are sequentially arranged in this order from an object side; and an aperture stop which moves integrally with the second group optical system, wherein, during change of magnification from a short focal end to a long focal end, the second group optical system monotonously moves from the image side to the object side, and the first group optical system moves so as to correct displacement of an image plane position in accordance with the change of magnification, and the following conditional formula is satisfied:

$$0.5 < A_W/A_T < 0.9$$

where a maximum diameter of the aperture stop at a wide angle end is $A_W$, and a maximum diameter of the aperture stop at a telephoto end is $A_T$.

In order to achieve the above described object, the zoom lens according to the present invention described in the third aspect is characterized by including: a first group optical system having a negative focal length, a second group optical system having a positive focal length, and a third group optical system having a positive focal length, which are sequentially arranged in a order from an object side; and an aperture stop which is disposed on the object side of the second group optical system and moves integrally with the second group optical system, wherein, during change of magnification from a short focal, the second group optical system monotonously moves from the image side to the object side, and the first group optical system moves so as to correct displacement of an image plane position in accordance with the change of magnification, and the following conditional formula is satisfied:

$$0.9 < F_T/F_W < 1.2$$

where a minimum F number at a wide angle end is FW, and a minimum F number at a telephoto end is FT.

In order to achieve the above described object, the zoom lens according to the present invention described in the fourth aspect is characterized by including: a first group optical system having a negative focal length, a second group optical system having a positive focal length, and a third group optical system having a positive focal length, which are sequentially arranged in this order from an object side; and an aperture stop which is disposed on the object side of the second group optical system and moves integrally with the second group optical system, wherein, during change of magnification from a short focal, the second group optical system monotonously moves from the image side to the object side, and the first group optical system moves so as to correct displacement of an image plane position in accordance with the change of magnification, and the following conditional formula is satisfied:

$$0.5 < A_W/A_T < 0.9$$

where a maximum diameter of the aperture stop at a wide angle end is $A_W$, and a maximum diameter of the aperture stop at a telephoto end is $A_T$.

In, order to achieve the above described object, the zoom lens according to the present invention described in the fifth aspect is characterized by including: a first group optical system having a negative focal length, a second group optical system having a positive focal length, and a third group optical system having a positive focal length, which are sequentially arranged in this order from an object side; and an aperture stop which is disposed on the object side of the second group optical system and moves integrally with the second group optical system, wherein, during change of magnification from a short focal end to a long focal end, the second group optical system monotonously moves from the image side to the object side, and the first group optical system moves so as to correct displacement of an image plane position in accordance with the change of magnification, and the following conditional formulas are satisfied:

$$2.0 < F_T < 3.0,$$

$$0.9 < F_T/F_W < 1.2, \text{ and}$$

$$0.5 < A_W/A_T < 0.9$$

where a minimum F number at a telephoto end is $F_T$, a maximum diameter of the aperture stop at a wide angle end is $A_W$, and a maximum diameter of the aperture stop at a telephoto end is $A_T$.

The zoom lens according to the present invention described in the sixth aspect is the zoom lens described in any one of the first to fourth aspects, characterized in that the following conditional formula is satisfied:

$$2.0 < F_T < 3.0$$

where a minimum F number at a telephoto end is $F_T$.

The zoom lens according to the present invention described in the seventh aspect is the zoom lens described in any one of the first to sixth aspects, characterized in that, during change of magnification from a short focal end to a long focal end, a maximum diameter of the aperture stop continuously changes.

The zoom lens according to the present invention described in the eighth aspect is the zoom lens described in any one of the first to sixth aspects, characterized in that, during change of magnification from a short focal end to a long focal end, a maximum diameter of the aperture stop changes in a stepwise manner, and the following conditional formula is satisfied:

$$A_W \times 2^{(N/4)} > A_T$$

where a maximum diameter of the aperture stop at a wide angle end is $A_W$, a maximum diameter of the aperture stop at a telephoto end is $A_T$, and the number of steps in the maximum diameter of the aperture stop is N.

The zoom lens according to the present invention described in the ninth aspect is the zoom lens described in any one of the third to fifth aspects, characterized in that the first group optical system is composed of at least one positive lens and at least one negative lens, the second group optical system is composed of at least two positive lenses and at least one negative lens, and the third group optical system is composed of at least one positive lens.

The zoom lens according to the present invention described in the tenth aspect is the zoom lens described in the ninth aspect, characterized in that the first group optical system, second group optical system, and third group optical system each contain at least one aspherical surface.

The zoom lens according to the present invention described in the eleventh aspect is the zoom lens described in any one of the first to sixth aspects, characterized in that the second group optical system contains at least two aspherical surfaces and the following conditional formula is satisfied:

$$1.5 < L_2/Y' < 2.5$$

where a thickness relevant to an optical axis direction of the second group optical system is $L_2$, and a maximum image height is Y'.

The zoom lens according to the present invention described in the twelfth aspect is the zoom lens described in the eleventh aspect, characterized in that an optical surface which is the closest to the object side and an optical surface which is the closest to the image side in the second group optical system are aspherical.

In order to achieve the aforementioned object, the camera according to the present invention described in thirteenth aspect is characterized by including the zoom lens described in any one of the first to twelfth aspects as a photography optical system.

In order to the above described object, the portable information terminal device according to the present invention described in the fourteenth aspect is characterized by including the zoom lens described in any one of the first to twelfth aspects as a photography optical system of a camera function section.

With the configuration of the first aspect, a zoom lens includes: at least a first group optical system having a negative focal length and a second group optical system having a positive focal length which are sequentially arranged in this order from an object side; and an aperture stop which moves integrally with the second optical system. During change of magnification from a short focal end to a long focal end, the second group optical system monotonously moves from the image side to the object side, and the first group optical system moves so as to correct displacement of an image plane position in accordance with the change of magnification. This zoom lens can acquire sufficient brightness even at the telephoto end while maintaining sufficiently small size and high performance. Moreover, the zoom lens is capable of reducing a change of brightness in accordance with zooming from the wide-angle end to the telephoto end. In addition, the zoom lens is capable of effectively reducing a change of brightness in accordance with zooming from the wide-angle end to the telephoto end while maintaining a sufficiently small size and high performance.

With the configuration of the second aspect, in particular, it is possible to effectively reduce a change of brightness in accordance with zooming from the wide-angle end to the telephoto end while maintaining sufficiently small size and high performance and maintaining sufficient brightness even at the telephoto end.

With the configuration of the third aspect, in particular, it is possible to effectively reduce a change of brightness in accordance with zooming from the wide-angle end to the telephoto end while maintaining sufficiently small size and high performance.

With the configuration of the fourth aspect, in particular, it is possible to effectively reduce a change of brightness in accordance with zooming from the wide-angle end to the telephoto end while maintaining sufficiently small size and high performance and maintaining sufficient brightness even at the telephoto end.

With the configuration of the fifth aspect, in particular, it is possible to maintain sufficiently small size and high performance, maintain sufficient brightness even at the telephoto end, and moreover, effectively reduce a change brightness in accordance with zooming from the wide angle end to the telephoto end.

With the configuration of the sixth aspect, it is possible to acquire sufficient brightness even at the telephoto end while maintaining sufficiently small size and high performance.

With the configuration of the seventh aspect, in particular, brightness does not change even in a middle focal length region, or even if the brightness changes, such change can be sufficiently smoothened.

With the configuration of the eighth aspect, in particular, it is possible to make brightness in a middle focal length region sufficiently constant, or to control the brightness with sufficient smoothness.

With the configuration of the ninth aspect, in particular, it is possible to achieve high performance with a simple configuration.

With the configuration of the tenth aspect, in particular, it is possible to achieve further high performance.

With the configuration of the eleventh aspect, in particular, it is possible to achieve further small size and high performance.

With the configuration of the twelfth aspect, in particular, it is possible to achieve further high performance.

With the configuration of the thirteenth aspect, in particular, a zoom lens for achieving at least sufficiently small size and high performance, establishment of sufficient brightness at the telephoto end, and reduction of change of brightness in accordance with zooming from the wide angle end to the telephoto end is used as a photography optical system, thereby making it possible to acquire small size and high performance.

With the configuration of the fourteenth aspect, in particular, a zoom lens for achieving at least sufficiently small size and high performance, establishment of sufficient brightness at the telephoto end, and reduction of change of brightness in accordance with zooming from the wide angle end to the telephoto end is used as a photography optical system of a camera function section, thereby making it possible to acquire small size and high performance.

In the present invention, in general, during change of magnification from a short focus to a long focal end, in a zoom lens composed of a group of three negative, positive, and positive lenses, a second group optical system monotonously moves from the image side to the object side, and a first group optical system moves so as to correct displacement of an image plane position in accordance with the change of magnification. The second optical system is responsible for a majority of magnification change functions, and a third group optical system is primarily provided to ensure that an ejection eyeball is distant from an image plane. In a zoom lens of such negative precedent type, the height from an optical axis of an axis external light flux incident to the first group optical system can be reduced. In addition, the zoom lens is composed of a group of three negative, positive, and positive lenses, whereby the full length can be comparatively reduced, and thus, is generally suitable for miniaturization.

The essence of the present invention is not limited to a zoom lens composed of a group of three negative, positive, and positive lenses in which "a first group optical system having a negative focal length, a second group optical system having a positive focal length, and a third group optical system having a positive focal length are sequentially arranged in this order from an object side, a aperture stop which moves integrally with the second group optical system is arranged on an object side of the second optical system, and during change of magnification from a short focal end to a long focal end, the second group optical system monotonously moves from the image side to the object side, and the first group optical system moves so as to correct displacement of an image plane position in accordance with the change of magnification".

In particular, the present invention can be widely applied to a zoom lens composed of two or more groups including a group of two negative and positive lenses, in which "a first group optical system having a negative focal length and a second group optical system having a positive focal length are sequentially arranged in this order from an object side, an aperture stop which moves integrally with the second group optical system is provided, and during change of magnification from a short focal end to a long focal end, the second group optical system monotonously moves from the image side to the object side, and the first group optical system moves so as to correct displacement of an image plane position in accordance with the change of magnification".

A zoom lens with a further high magnification can be achieved depending on the configuration of the third group optical system and subsequent, and further miniaturization can be achieved by providing a configuration of only a group of two negative and positive lenses from the first group optical system to the second group optical system.

According to the present invention, a zoom lens of such negative precedent type suitable for miniaturization thereof is configured so as to meet the following conditional formula:

$$0.9 < F_T/F_W < 1.2$$

where $F_W$ denotes a minimum F number at a wide angle end, and $F_T$ denotes a minimum F number at a telephoto end.

If ($F_T/F_W$) is equal to or smaller than 0.9, the wide angle end becomes too bright, thereby making it difficult to correct aberration and ensure performance at the wide angle end. In addition, if ($F_T/F_W$) is equal to or greater than 1.2, a change of brightness in accordance with zooming from the wide angle end to the telephoto end becomes too large, and exposure control during monitoring using a display device becomes complicated.

According to the present invention, in the same manner as that described above, a zoom lens of such negative precedent type suitable for miniaturization is configured so as to meet the following conditional formula:

$$0.5 < A_W/A_T < 0.9$$

where $A_W$ denotes a maximum diameter of the aperture stop at a wide angle end, and $A_T$ denotes a maximum diameter of the aperture stop at a telephoto end. Namely, the maximum diameter of aperture stop of the zoom lens is configured so as to be different from that of the telephoto end, and the maximum diameter of aperture stop at the telephoto end is configured so as to greater than that at the wide angle end.

If ($A_W/A_T$) is equal to or smaller than 0.5, the wide angle end becomes too bright, thereby making it difficult to correct aberration and ensure performance at the wide angle end. If ($A_W/A_T$) is equal to or greater than 0.9, a change of brightness in accordance with zooming from the wide angle end to the telephoto end becomes too large, and exposure control during monitoring using a display device becomes complicated.

The zoom lens of the present invention is configured so as to meet the following conditional formula at the same time, thereby establish the most desirable state which is sufficiently bright even at the telephoto end and which is small in change of brightness in accordance with zooming from the wide angle end to the telephoto end:

$$2.0 < F_T < 3.0$$

$$0.9 < F_T/F_W < 1.2$$

$$0.5 < A_W/A_T < 0.9$$

where $F_T$ denotes a minimum F number at the telephoto end.

If $F_T$ is equal to or smaller than 2.0, the wide-angle end becomes too bright, and the aberrations increase, thereby making it difficult to correct these aberrations. In addition, if $F_T$ is equal to or greater than 3.0, sufficient brightness cannot be established at the telephoto end, and the degree of illumination on an image plane becomes insufficient. Thus, a shutter speed is delayed, and a hand motion or an object motion is easily produced, Further, at this time, if the shutter speed is prevented from being delayed by increasing gain of an imaging device, it causes a noise increase, and a photographed image quality is lowered.

Moreover, recently, an imaging device such as a CCD imaging device which is widely used for a digital camera or the like is small as compared with a conventional silver film, the number of images is moreover increased, and the size per pixel is around 2 μm. Thus, although the required resolution on an image plane, i.e., the resolution may be about 30 per mm in the case of a conventional silver lead camera, about 150 to 200 per mm is requested in the case of the CCD imaging device. If the lens is dark, i.e., if the F number is large, an effect of refraction increases, and the limit frequency is lowered, thus making it difficult to theoretically obtain such high resolution. Even at such a point, it is effective that $F_T$ is less than 3.0. A condition for the minimum F number $F_T$ at this telephoto end can be applied to a zoom lens configured to include a group of two negative and positive lenses.

According to the present invention, a condition for ($F_T/F_W$), a condition for ($A_W/A_T$), and a condition for the minimum F number $F_T$ at the telephoto end are further added to the zoom lens composed of a groups of three negative, positive, and positive lenses. However, a condition for the minimum F number $F_T$ at this telephoto end may be combined with either one of other two conditions. As long as a configuration of two groups or more including a group of two negative and positive lenses, the present invention may be applied to such a zoom lens.

In the case where the maximum aperture stop diameter $A_T$ on the telephoto end is set to be greater than the maximum diameter of aperture stop $A_W$ at the wide angle end, the present invention can be configured so that the maximum diameter of aperture stop continuously changes with zooming, and can be configured so that the diameter changes in a stepwise manner. Further, in the case where the present invention is configured so that the maximum diameter of aperture stop changes in a stepwise manner with zooming, it is desirable that the following conditional formula is satisfied:

$$A_W \times 2^{(N/4)} > A_T$$

where N denotes the number of steps in maximum diameter of the aperture stop. In the case where the number N of steps is a small numeric value which cannot meet this formula, a change of brightness in lens with zooming lacks smoothness (in the case where the brightness of lens does not change with zooming, the degree of stability becomes inferior). For example, in the case where zooming from the wide-angle end to the telephoto end is carried out while monitoring, a change of brightness in a monitor image becomes easily significant.

Further, in the zoom lens according to the present invention, in order to obtain high focusing performance, it is desirable that the first group optical system is configured to include at least one positive lens and at least one negative lens, and the second group optical system is configured to include at least two positive lenses and at least one negative lens, and the third group optical system is configured to include at least one positive lens. The first group optical system is composed of three lenses or less, the second group optical system is composed of four lenses or more, and the third group optical system is composed of two lenses or less, whereby high imaging performance and sufficient miniaturization can be compatible with each other.

In addition, in order to carry out better aberration correction, it is desirable that one or more aspherical surfaces be used for an optical system of each group. In particular, the zoom lens according to the present invention is bright at the telephoto end, and it is required to better correct spherical aberration or frame aberration. Thus, an effect in accordance with using an aspherical surface for an optical system of each group is very large. An aspherical surface used for the first group optical system primarily contributes to distortion aberration at the wide-angle end and a spherical aberration at the telephoto end. An aspherical surface used for the second group optical system contributes to spherical aberration or frame aberration through the entire zoom area and correction of astigmatism. An aspherical surface used for the third group optical system contributes to astigmatism through the entire zoom area and correction of distortion aberration.

The spherical surface disposed in the optical system of each group brings mutually different effects in this way, thus making it possible to correct aberration in a well balanced manner as a whole and to ensure higher focusing performance.

Further, it is desirable that two or more spherical surfaces are used for the second group optical system. As already described above, the zoom lens according to the present invention is bright at the telephoto end, and it is required to better correct spherical aberration or frame aberration. The second group optical system is positioned in the vicinity of the aperture stop. Thus, this optical system is thick in light flux, and greatly contributes to spherical aberration and frame aberration.

Two aspherical surfaces are used for portions at which rays of light pass differently from each other, thereby making it possible to improve the degree of freedom in correction of aberration. In this manner, assuming that two spherical surfaces are used for the second group optical system, it is desirable to meet the following conditional formula in order to achieve sufficient miniaturization and high performance:

$$1.5 < L_2/Y' < 2.5$$

where $L_2$ denotes a thickness relevant to the optical axis direction of the second group optical system, and Y' denotes the maximum image height.

Here, if ($L_2/Y'$) is equal to or greater than 2.5, the thickness in the optical axis direction of the second group increases, making it possible to achieve sufficient miniaturization. On the other band, if ($L_2/Y'$) is equal to or smaller than 1.5, the surface which is the closest to the image side of the second group optical system approaches the aperture stop, thereby making it impossible to dispose two aspherical surfaces at portions at which rays of light pass sufficiently differently from each other. Thus, an effect of using two aspherical surfaces is reduced.

It is desirable to make a non-spherical surface proximate to the object side of the second group optical system and a surface close to the image side in order to carry out the most effective correction of aberration when two or more aspherical surfaces are used for the second group optical system. Since the surface proximate to the object side of the second optical system is in the vicinity of the aperture stop, rays of light on and outside an axis pass without almost being separated from each other.

The thus provided aspherical surfaces primarily contribute to correction of spherical aberration or frame aberration. On the other hand, since the surface proximate to the image side of the second optical system is distant from the aperture stop, the light fluxes on and outside the axis pass with being separated from each other to some extent. The thus provided spherical surfaces contribute to correction of frame aberration and non-spherical aberration. In this way, the two aspherical surfaces are used for the surface proximate to the object side or the surface proximate to the image side, whereby the respective aspherical surfaces bring sufficiently different effect, and the degree of freedom in correction of aberration significantly increases.

BRIEF DESCRIPTION OF THE DRAWINGS

FIGS. 1A to 1C are sectional views taken along an optical axis, for schematically showing a configuration of an optical system of a zoom lens according to a first embodiment of the present invention, in which FIG. 1A shows a state of a short focal length end which is a wide angle end; FIG. 1B shows a state of a middle focal length; and FIG. 1C shows a state of a long focal length end which is a telephoto end.

FIGS. 2A to 2C are sectional views taken along an optical axis, for schematically showing a configuration of an optical system of a zoom lens according to a second embodiment of the present invention, in which FIG. 2A shows a state of a short focal length end which is a wide angle end; FIG. 2B shows a state of a middle focal length; and FIG. 2C shows a state of a long focal length end which is a telephoto end.

FIGS. 3A to 3C are sectional views taken along an optical axis, for schematically showing a configuration of an optical system of a zoom lens according to a third embodiment of the present invention, in which FIG. 3A shows a state of a short focal length end which is a wide angle end; FIG. 3B shows a state of a middle focal length; and FIG. 3C shows a state of a long focal length end which is a telephoto end.

FIGS. 4A to 4C are sectional views taken along an optical axis, for schematically showing a configuration of an optical system of a zoom lens according to a fourth embodiment of the present invention, in which FIG. 4A shows a state of a short focal length end which is a wide angle end; FIG. 4B shows a state of a middle focal length; and FIG. 4C shows a state of a long focal length end which is a telephoto end.

FIG. 7 is an aberration curve diameter showing spherical aberration, astigmatism, distortion aberration, and frame aberration at the long focal end of the zoom lens according to the first embodiment of the present invention shown in FIG. 1.

FIG. 8 is an aberration curve diameter showing spherical aberration, astigmatism, distortion aberration, and frame aberration at the short focal end of the zoom lens according to the second embodiment of the present invention shown in FIG. 2.

FIG. 15 is an aberration curve diameter showing spherical aberration, astigmatism, distortion aberration, and frame aberration in middle focal length of the zoom lens according to the fourth embodiment of the present invention shown in FIG. 4.

FIG. 16 is an aberration curve diameter showing spherical aberration, astigmatism, distortion aberration, and frame aberration at the long focal end of the zoom lens according to the fourth embodiment of the present invention shown in FIG. 4.

FIGS. 17A and 17B are perspective views seen from an object side, for schematically showing an external construction of a camera according to a fifth embodiment of the present invention, in which FIG. 17A shows a state in which a photographing lens is sunk and embedded in a camera body, and FIG. 17B shows a state in which a photographing lens is extruded from the camera body.

DETAILED DESCRIPTION OF THE PREFERRED EMBODIMENTS

Now, specific embodiments of a zoom lens, camera, and portable information terminal device according to the present invention, which reflects the configuration as described above will be described in detail with reference to the accompanying drawings.

First, second, third, and fourth embodiments are based on specific numeric values of the zoom lens according to the present invention. A fifth embodiment is directed to the camera according to the present invention when the zoom lens as shown in the first to fourth embodiments is used as a photography optical system.

With respect to the first to fourth embodiments showing the zoom lens according to the present invention, there are shown a configuration of the zoom lens and its specific embodiment of numeric value. The maximum image height in the first to fourth embodiments is 3.50 mm. In each of the first to fourth embodiments, aberration is sufficiently corrected, thereby making it possible to cope with light receiving elements of 2,000,000 pixels to 4,000,000 pixels. As in the present invention, it would be evident from the first to fourth embodiments to ensure very excellent image performance while sufficient miniaturization is achieved by configuring the zoom lens.

In the following descriptions associated with the first to fourth embodiments, the following various signs are used.

f: Focal length of entire system
F: F number
ω: Half angle of view
R: Curvature radius
D: Face interval
$N_d$: Refraction index
$v_d$: Abbe number
K: Conical constant of aspherical surface
$A_4$: Fourth-order aspherical coefficient
$A_6$: Sixth-order aspherical coefficient
$A_8$: Eighth-order aspherical coefficient
$A_{10}$: Tenth-order aspherical coefficient
$A_{12}$: Twelfth-order aspherical coefficient
$A_{14}$: Fourteenth-order aspherical coefficient
$A_{16}$: Sixteenth-order aspherical coefficient
$A_{18}$: Eighteenth-order aspherical coefficient The aspherical surface used here is defined in the following formula:

$$X = \frac{CH^2}{1+\sqrt{1-(1+K)C^2H^2}} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18} \quad \text{(Formula 1)}$$

where an inverted number of a proximal axis curvature radius (proximal axis curvature) is C and the height of an optical axis is H.

(First Embodiment)

FIGS. 1A to 1C show a configuration of an optical system of the zoom lens according to the first embodiment of the present invention. In order to grasp a zooming operation, FIG. 1A is a sectional view schematically showing a state of a short focal length end which is a wide angle end; FIG. 1B is a sectional view schematically showing a state of a middle focal length; and FIG. 1C is a sectional view taken along an optical axis schematically showing a state of a long focal length end which is a telephoto end, respectively.

Figure 1:
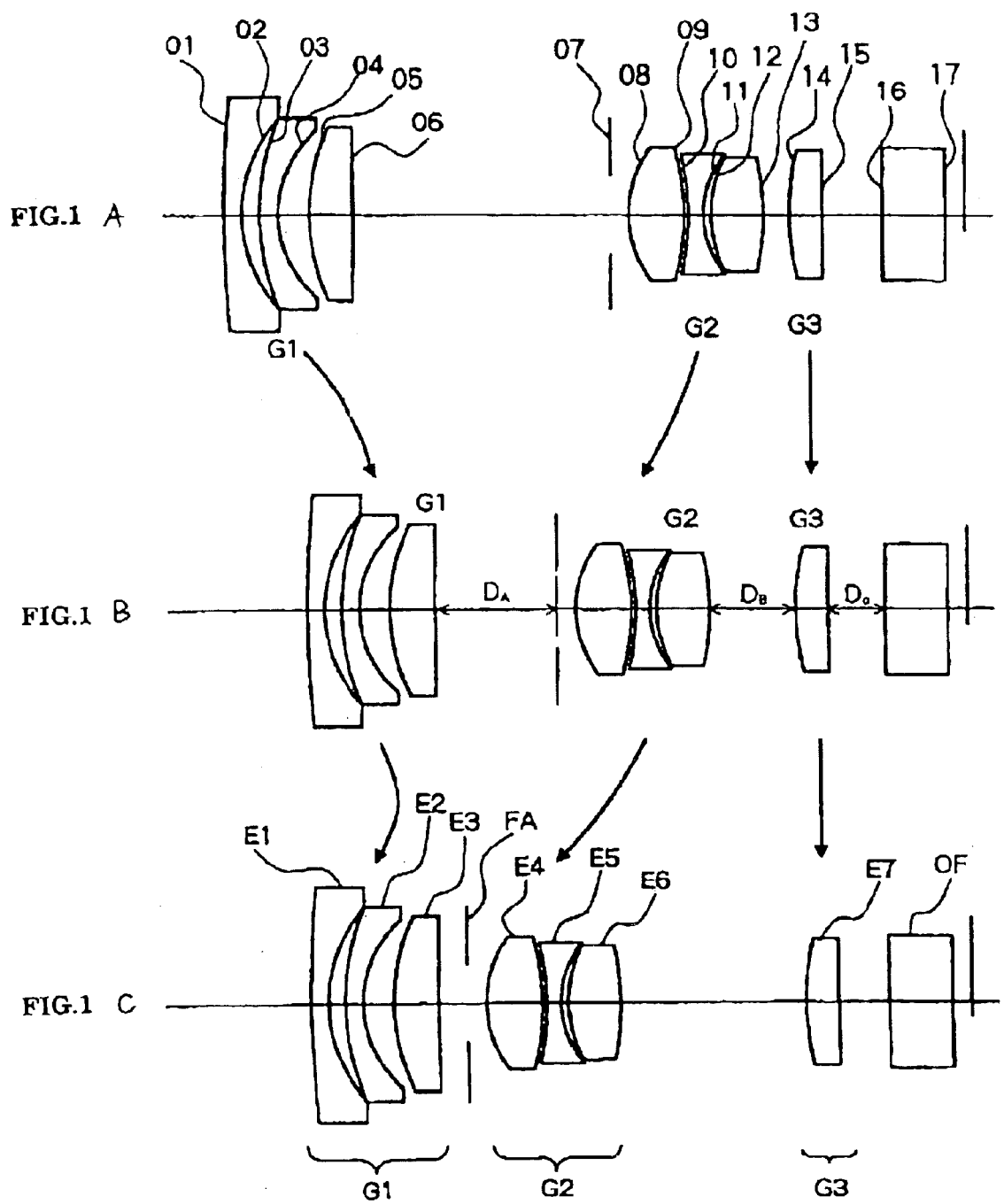

A zoom lens shown in FIG. 1 comprises a first lens E1, a second lens E2, a third lens E3, a fourth lens E4, a fifth lens E5, a sixth lens E6, a seventh lens E7, a aperture stop lens E3, and an optical filter OF. In this case, the first lens E1 to third lens E3 configure a first group optical system G1; the fourth lens E4 to sixth lens E6 configure a second group optical system E2; and the seventh lens E7 configures a third group optical system G3. Each of these lenses is supported by a common support frame or the lime which is suitable to each group. During zooming or the like, these lenses each operate integrally with each group. In the Figure, these elements are designated by face numbers (O1 to O17) of each optical surface.

Reference numerals in FIG. 1 are independently used for each embodiment for the sake of clarity. Therefore, even if common reference numeral is designated, it does not mean common construction to another embodiment.

In FIG. 1, for example, the first lens E1, second lens E2, third lend E3, aperture stop FA, fourth lens E4, fifth lens E5, sixth lens E6, seventh lens E7, and optical filter OF are sequentially arranged in this order from an object side of an object to be photographed or the like, and an image is formed at the rear of the optical filter OF having a variety of optical filtering functions.

The first lens E1 configuring the first group optical system G1 is a negative meniscus lens formed on the object side in a protrusive manner; the second lens E2 is a negative meniscus lens formed on the object side in a protrusive manner; and the third lens E3 is a positive lens (a flat convex lens) on which the object side is formed as a protrusive face, respectively, which exhibits a negative focal length as a whole. The fourth lens E4 configuring the second group optical system G2 is a positive lens (double-convex lens); the fifth lens E5 is a negative lens (double-concave lens); and the sixth lens E6 is a positive lens (double-convex lens), which exhibits a positive focal length as a whole. The seventh lens E7 configuring the third group optical system G3 is a positive lens (double-convex lens) having a positive focal length. The aperture stop FA disposed on the object side of the second group optical system G2 operates integrally with the second group optical system G2. During change of magnification from the short focal end to the long focal end, the second group optical system G2 monotonously moves from the image side to the object side, and the first group optical system G1 moves so as to correct displacement of an image plane position in accordance with the change of magnification.

In this first embodiment, the focal length "f" of entire system, F number "F", and a half-angle of view "ω" are changed by zooming in the range of "f"=4.32 to 10.29, F=2.80 to 2.80, and "ω"=40.33 to 18.97 (where the F number "F" is the same value at the short focal end to the long focal end because F=2.80 to 2.80, and does not change). The characteristics of each optical surface are shown in the table below.

TABLE 1

Optical characteristics

| Face number | R | D | $N_d$ | $v_d$ | Remarks | |
|---|---|---|---|---|---|---|
| 01 | 53.154 | 1.00 | 1.77250 | 49.62 | First lens | First group |
| 02 | 7.880 | 0.99 | | | | |
| 03 | 13.645 | 1.00 | 1.74330 | 49.33 | Second lens | |
| 04* | 4.995 | 1.74 | | | | |
| 05 | 10.390 | 2.42 | 1.74077 | 27.76 | Third lens | |
| 06 | ∞ | Variable: $D_A$ | | | | |
| 07 | Aperture stop | 1.00 | | | | |
| 08* | 5.230 | 3.03 | 1.72342 | 37.99 | Fourth lens | Second group |
| 09 | −16.254 | 0.22 | | | | |
| 10 | −12.979 | 0.80 | 1.80518 | 25.46 | Fifth lens | |
| 11 | 4.615 | 0.41 | | | | |
| 12 | 6.515 | 2.80 | 1.51680 | 64.20 | Sixth lens | |
| 13* | −11.233 | Variable: $D_B$ | | | | |
| 14* | 13.372 | 1.78 | 1.48749 | 70.44 | Seventh lens | Third group |
| 15 | −259.384 | Variable: $D_C$ | | | | |
| 16 | ∞ | 3.25 | 1.51680 | 64.20 | Various filters | |
| 17 | ∞ | | | | | |

In Table 1, optical surfaces of fourth, eighth, thirteenth, and fourteenth faces marked with asterisks on the face numbers are non-spherical, and the parameters of the aspherical surfaces are as follows:

Aspherical Surface: Fourth Face $K=0.0, A_4=-1.01786\times10^{-3}, A_6=-4.34496\times10^{-5}, A_8=2.94761\times10^{-6},$
$A_{10}=-2.24518\times10^{-7}, A_{12}=-4.09229\times10^{-9}, A_{14}=8.81736\times10^{-10},$
$A_{16}=-3.03727\times10^{-11}, A_{18}=1.79123\times10^{-13}$ Aspherical Surface: Eighth Face $K=0.0, A_4=-2.84067\times10^{-4}, A_6=-7.82054\times10^{-6}, A_8=2.21489\times10^{-7},$
$A_{10}=-2.28864\times10^{-8}$ Aspherical Surface: Thirteenth Face $K=0.0, A_4=5.01081\times10^{-4}, A_6=2.38233\times10^{-5}, A_8=-1.25684\times10^{-6},$
$A_{10}=9.83467\times10^{-8}$ Aspherical Surface: Fourteenth Face $K=0.0, A_4=-2.40056\times10^{-4}, A_6=2.96949\times10^{-5}, A_8=-2.79945\times10^{-6},$
$A_{10}=9.56076\times10^{-8}$ An interval $D_A$ between the first group optical system G1 and the aperture stop FA integrated with the second group optical system G2; an interval $D_B$ between the second group optical system G2 and the third group optical system G3; and an interval $D_C$ between the third group optical system G3 and the optical filter OF are variable, and these variable intervals $D_A$ to $D_C$ are changed during zooming, as shown in the table below.

TABLE 2

Variable intervals

| | Short focal end F = 4.32 | Middle focal length f = 6.64 | Long focal end f = 10.29 |
|---|---|---|---|
| $D_A$ | 13.970 | 6.470 | 1.570 |
| $D_B$ | 1.440 | 4.740 | 10.050 |
| $D_C$ | 3.152 | 3.021 | 2.652 |

In addition, the numeral values according to conditional formulas of the present invention, which have been described previously in this first embodiment are as follows, and are in the range of each of the conditional formulas.
Numerical Values of Each Conditional Formula $F_T=2.80$ $F_T/F_W=1.00$ $A_W=4.226$ $A_T=6.258$ $A_W/A_T=0.675$ $A_W \times 2^{(N/4)}=7.107$ $(N=3)$ $L_2/Y'=2.07$ (Second Embodiment)

FIGS. 2A to 2C show a construction of an optical system of the zoom lens according to the second embodiment of the present invention. In order to grasp a zooming operation, FIG. 2A is a sectional view taken along an optical axis, for schematically showing a short focal length end which is a wide angle end; FIG. 2B is a sectional view schematically showing a state of a middle focal length; and FIG. 2C is a sectional view taken along an optical axis, for schematically showing a state of a long focal length end which is a telephoto end, respectively.

Figure 2:
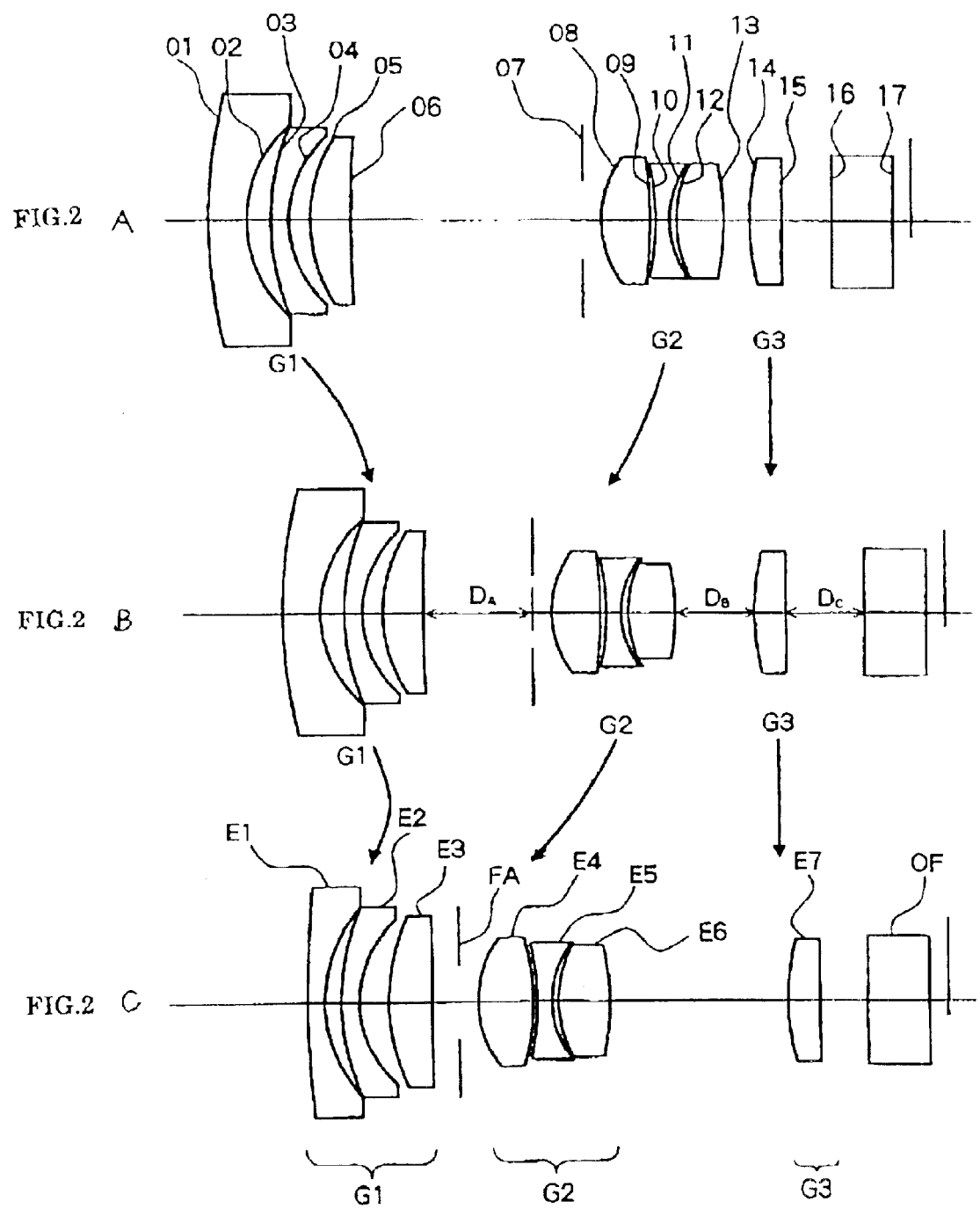

A zoom lens shown in FIG. 2 comprises a first lens E1, a second lens E2, a third lens E3, a fourth lens E4, a fifth lens E5, a sixth lens E6, a seventh lens E7, an aperture stop FA, and an optical filter OF. In this case, the first lens E1 to third lens E3 configure a first group optical system G1; the fourth lens E4 to sixth lens E6 configure a second group optical system G2; and the seventh lens E7 configures a third group optical system G3. In the drawings, optical surfaces are designated by numbers of their corresponding face. As described above, reference numerals in FIG. 2 are used independently of another embodiment.

In FIG. 2 as well, for example, the first lens E1, second lens E2, third lend E3, aperture stop FA, fourth lens E4, fifth lens E5, sixth lens E6, seventh lens E7, and optical filter OF are sequentially arranged in this order from an object side of an object to be photographed or the like, and an image is formed at the rear of the optical filter OF having a variety of optical filtering functions. The first lens E1 configuring the first group optical system G1 is a negative meniscus lens formed on the object side in a protrusive manner; the second lens E2 is a negative meniscus lens formed on the object side in a protrusive manner; and the third lens E3 is a positive lens (a flat convex lens) on which the object side is formed as a protrusive face, respectively, which exhibits a negative focal length as a whole. The fourth lens E4 configuring the second group optical system G2 is a positive lens (double-convex lens); the fifth lens E5 is a negative lens (double-concave lens); and the sixth lens E6 is a positive lens (double-convex lens), which exhibits a positive focal length as a whole. The seventh lens E7 configuring the third group optical system G3 is a positive meniscus lens having a positive focal length. The aperture stop FA disposed on the object side of the second group optical system G2 operates integrally with the second group optical system G2. During change of magnification from the short focal end to the long focal end, the second group optical system G2 monotonously moves from the image side to the object side, and the first group optical system G1 moves so as to correct displacement of an image plane position in accordance with the change of magnification.

In this second embodiment, the focal length "f" of entire system, F number "F", and a half-angle of view "ω" are changed by zooming in the range of "f"=4.33 to 10.29, F=2.40 to 2.80, and "ω"=40.22 to 19.00, respectively. The characteristics of each optical surface are shown in the table below.

TABLE 3

Optical characteristics

| Face number | R | D | $N_d$ | $\upsilon_d$ | Remarks | |
|---|---|---|---|---|---|---|
| 01 | 31.113 | 2.11 | 1.77250 | 49.62 | First lens | First group |
| 02 | 6.771 | 1.28 | | | | |
| 03 | 12.954 | 1.01 | 1.74330 | 49.33 | Second lens | |
| 04* | 4.812 | 1.29 | | | | |
| 05 | 8.371 | 2.28 | 1.72825 | 28.32 | Third lens | |
| 06 | 763.543 | Variable: $D_A$ | | | | |
| 07 | Aperture stop | 1.00 | | | | |
| 08* | 5.183 | 2.71 | 1.73077 | 40.50 | Fourth lens | Second group |
| 09 | −26.026 | 0.33 | | | | |
| 10 | −15.984 | 0.80 | 1.80518 | 25.46 | Fifth lens | |
| 11 | 4.855 | 0.40 | | | | |
| 12 | 7.141 | 2.69 | 1.56384 | 60.83 | Sixth lens | |
| 13* | −10.770 | Variable: $D_B$ | | | | |
| 14* | 13.431 | 1.67 | 1.48749 | 70.44 | Seventh lens | Third group |
| 15 | 163.760 | Variable: $D_C$ | | | | |
| 16 | ∞ | 3.25 | 1.51680 | 64.20 | Various filters | |
| 17 | ∞ | | | | | |

In Table 3, the optical surfaces of the fourth face, eighth face, thirteenth face, and fourteenth face marked with asterisks * on face numbers are non-spherical, and parameters of aspherical surfaces are as follows.

Aspherical Surface: Fourth Face $K=0.0, A_4=-9.85208\times10^{-4}, A_6=-5.68757\times10^{-5}, A_8=3.93763\times10^{-6}, A_{10}=-2.94448\times10^{-7}, A_{12}=-5.86638\times10^{-9}, A_{14}=1.13440\times10^{-9}, A_{15}=-3.40400\times10^{-11}, A_{18}=-3.48568\times10^{-14}$ Aspherical Surface: Eighth Face $K=0.0, A_4=-2.80888\times10^{-4}, A_6=-1.46680\times10^{-5}, A_8=9.27344\times10^{-7}, A_{10}=-4.72264\times10^{-8}$ Aspherical Surface: Thirteenth Face $K=0.0, A_4=5.55782\times10^{-4}, A_5=4.65359\times10^{-5}, A_8=-4.36558\times10^{-6}, A_{10}=3.66469\times10^{-7}$ Aspherical Surface: Fourteenth Face $K=0.0, A_4=-2.28823\times10^{-4}, A_6=2.70113\times10^{-5}, A_8=-2.14113\times10^{-6}, A_{10}=7.50132\times10^{-8}$ An interval $D_A$ between the first group optical system G1 and the aperture stop FA integrated with the second group optical system G2; an interval $D_B$ between the second group optical system G2 and the third group optical system G3; and an interval $D_C$ between the third group optical system G3 and the optical filter OF are variable, and these variable intervals $D_A$ to $D_C$ are changed during zooming, as shown in the table below.

TABLE 4

Variable intervals

| | Short focal end<br>F = 4.33 | Middle focal length<br>f = 6.64 | Long focal end<br>f = 10.29 |
|---|---|---|---|
| $D_A$ | 12.960 | 6.020 | 1.360 |
| $D_B$ | 1.450 | 4.540 | 9.140 |
| $D_C$ | 2.944 | 2.775 | 2.663 |

In addition, the numeral values according to conditional formulas of the present invention, which have been described previously in this first embodiment are as follows, and are in the range of each of the conditional formulas. Numerical Values of Each Conditional Formula $F_T=2.80$ $F_T/F_W=1.17$ $A_W=4.730$ $A_T=5.896$ $A_W/A_T=0.802$ $A_W \times 2^{(N/4)}=6.689$ (N=2)

$L_2/Y'=1.98$ (Third Embodiment)

Figure 3:
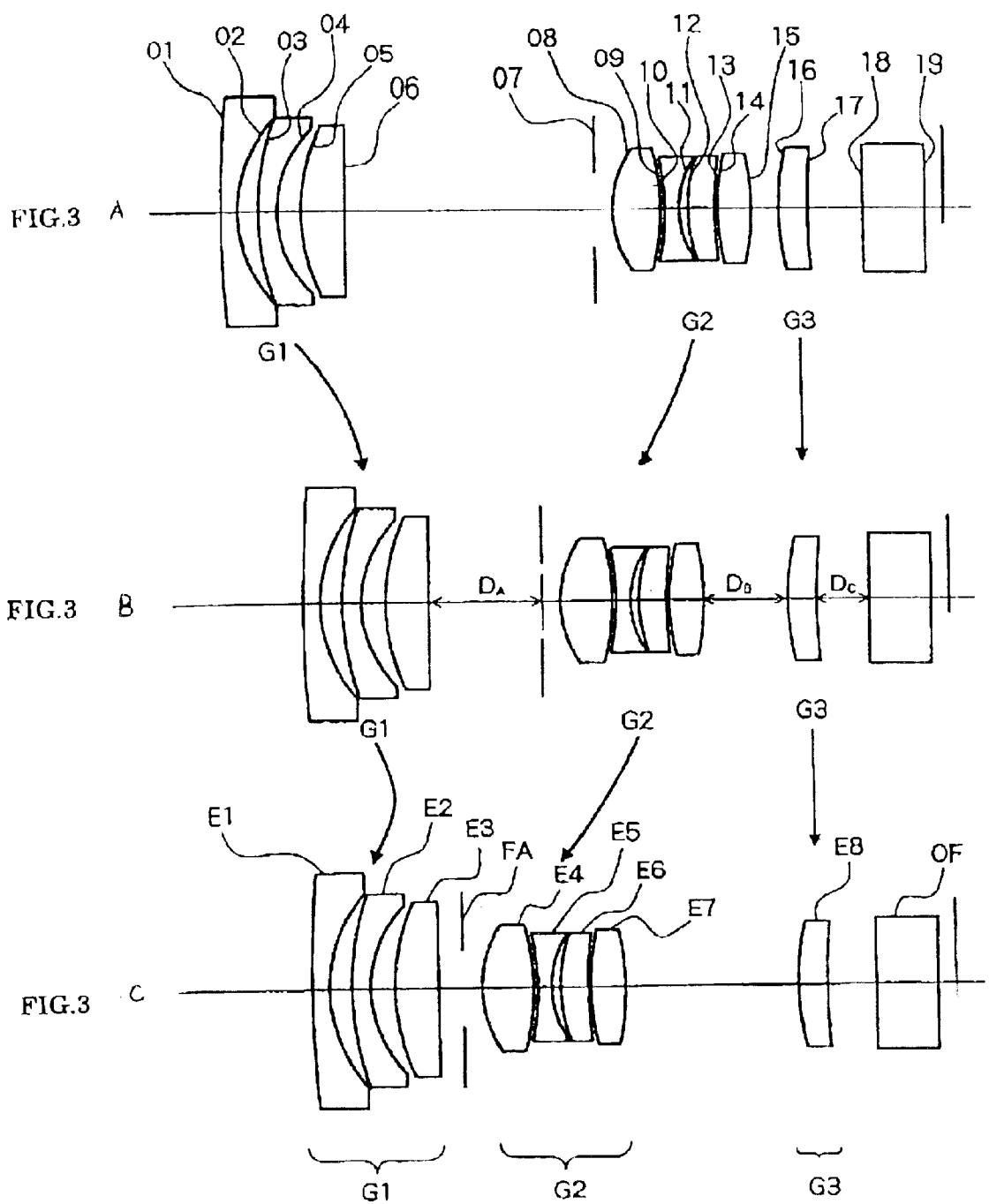

A zoom lens shown in FIG. 3 comprises a first lens E1, a second lens E2, a third lens E3, a fourth lens E4, a fifth lens E5, a sixth lens E6, a seventh lens E7, an eighth lens E8, a aperture stop FA, and an optical filter OF. In this case, the first lens E1 to third lens E3 configure a first group optical system G1; the fourth lens E4 to seventh lens E7 configure a second group optical system G2; and the eighth lens E8 configures a third group optical system G3. In the Figure, optical surfaces are designated by numbers of their corresponding face. As described above, reference numerals in FIG. 3 are used independently of another embodiment.

In FIG. 3 as well, for example, the first lens E1, second lens E2, third lend E3, aperture stop FA, fourth lens E4, fifth lens E5, sixth lens E6, seventh lens E7, eighth lens E8 and optical filter OF are sequentially arranged in this order from an object side of an object or the like, and an image is formed at the rear of the optical filter OF. The first lens E1 configuring the first group optical system G1 is a negative meniscus lens formed on the object side in a protrusive manner; the second lens E2 is a negative meniscus lens formed on the object side in a protrusive manner; and the third lens E3 is a positive lens (a flat convex lens) on which the object side is formed as a protrusive face, respectively, which exhibits a negative focal length as a whole. The fourth lens E4 configuring the second group optical system G2 is a positive lens (double-convex lens); the fifth lens E5 is a negative lens (double-concave lens); the sixth lens E6 is a positive meniscus lens (double-convex lens) formed on the object side in a protrusive manner; and the seventh lens E7 is a positive lens (double-convex lens), which exhibits a positive focal length as a whole.

The eighth lens E8 configuring the third group optical system G3 is a positive meniscus lens having a positive focal length. The aperture stop FA disposed on the object side of the second group optical system G2 operates integrally with the second group optical system G2. During change of magnification from the short focal end to the long focal end, the second group optical system G2 monotonously moves from the image side to the object side, and the first group optical system G1 moves so as to correct displacement of an image plane position in accordance with the change of magnification.

In this third embodiment, the focal length "f" of entire system, F number "F", and a half-angle of view "ω" are changed by zooming in the range of "f"=4.33 to 10.18, F=2.40 to 2.80, and "ω"=40.32 to 19.17, respectively. The characteristics of each optical surface are shown in the table below.

TABLE 5

Optical characteristics

| Face number | R | D | $N_d$ | $\upsilon_d$ | Remarks | |
|---|---|---|---|---|---|---|
| 01 | 38.947 | 1.00 | 1.77250 | 49.62 | First lens | First group |
| 02 | 7.115 | 1.24 | | | | |
| 03 | 14.097 | 1.01 | 1.74330 | 49.33 | Second lens | |
| 04* | 5.017 | 1.39 | | | | |
| 05 | 9.458 | 2.38 | 1.72825 | 28.32 | Third lens | |
| 06 | ∞ | Variable: $D_A$ | | | | |
| 07 | Aperture stop | 1.00 | | | | |
| 08* | 5.313 | 2.75 | 1.72342 | 37.99 | Fourth lens | Second group |
| 09 | −16.434 | 0.30 | | | | |
| 10 | −11.973 | 0.80 | 1.80518 | 25.46 | Fifth lens | |
| 11 | 4.989 | 0.45 | | | | |
| 12 | 7.515 | 1.60 | 1.58913 | 61.25 | Sixth lens | |
| 13 | 20.251 | 0.10 | | | | |
| 14 | 13.893 | 1.86 | 1.48749 | 70.44 | Seventh lens | |
| 15* | −11.395 | Variable: $D_B$ | | | | |
| 16* | 12.322 | 1.65 | 1.48749 | 70.44 | Eighth lens | Third group |
| 17 | 83.540 | Variable: $D_C$ | | | | |
| 18 | ∞ | 3.25 | 1.51680 | 64.20 | Various filters | |
| 19 | ∞ | | | | | |

In Table 5, the optical surfaces of the fourth face, eighth face, fifteenth face, and sixteenth face marked with asterisks * on face numbers are non-spherical, and the parameters of the aspherical surfaces are as follows.

Aspherical Surface: Fourth Face $K=0.0, A_4=-1.02022\times10^{-3}, A_6=-3.93818\times10^{-5}, A_8=1.97916\times10^{-6}, A_{10}=-1.53007\times10^{-7}, A_{12}=-4.44419\times10^{-9}, A_{14}=7.31585\times10^{-10}, A_{16}=2.62460\times10^{-11}, A_{18}=1.92610\times10^{-13}$ Aspherical Surface: Eighth Face $K=0.0, A_4=-2.24405\times10^{-4}, A_6=-8.90364\times10^{-6}, A_8=4.63818\times10^{-7}, A_{10}=-2.3746\times10^{-8}$ Aspherical Surface: Fifteenth Face $K=0.0, A_4=5.53413\times10^{-4}, A_6=4.41225\times10^{-5}, A_8=-3.65290\times10^{-6}, A_{10}=2.40663\times10^{-7}$ Aspherical Surface: Sixteenth Face $K=0.0, A_4=-2.20885\times10^{-4}, A_6=1.16366\times10^{-5}, A_8=-8.37756\times10^{-7}, A_{10}=3.42795\times10^{-8}$ An interval $D_A$ between the first group optical system G1 and the aperture stop FA integrated with the second group optical system G2; an interval $D_B$ between the second group optical system G2 and the third group optical system G3; and an interval $D_C$ between the third group optical system G3 and the optical filter OF are variable, and these variable intervals $D_A$ to $D_C$ are changed during zooming, as shown in the table below.

TABLE 6

| | Variable interval | | |
|---|---|---|---|
| | Short focal end<br>F = 4.33 | Middle focal length<br>f = 6.64 | Long focal end<br>f = 10.18 |
| $D_A$ | 13.700 | 6.310 | 1.430 |
| $D_B$ | 1.450 | 4.760 | 9.540 |
| $D_C$ | 3.107 | 2.908 | 2.759 |

In addition, the numeral values according to conditional formulas of the present invention, which have been described previously in this third embodiment are as follows, and are in the range of each of the conditional formulas.

Numerical Values of Each Conditional Formula $F_T = 2.80$ $F_T/F_W = 1.17$ $A_W = 4.926$ $A_T = 6.068$ $A_W/A_T = 0.812$ $A_W \times 2^{(N/4)} = 6.966$ (N=2)

$L_2/Y' = 2.25$ (Fourth Embodiment)

FIGS. 4A to 4C show a configuration of an optical system of the zoom lens according to the fourth embodiment of the present invention, in which FIG. 4A is a sectional view schematically showing a state of a short focal length end which is a wide angle end; FIG. 4B is a sectional view schematically showing a state of a middle focal length; and FIG. 4C is a sectional view taken along an optical axis, for schematically showing a state of a long focal length end which is a telephoto end, respectively.

Figure 4:
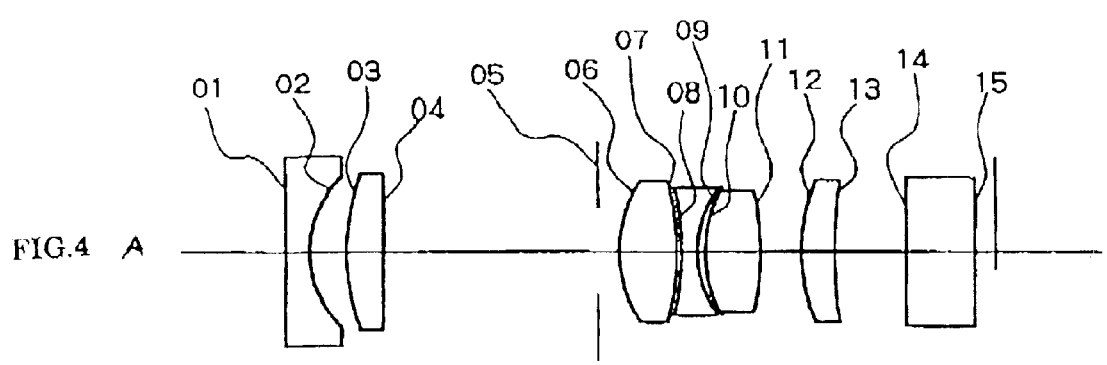
Figure 4:
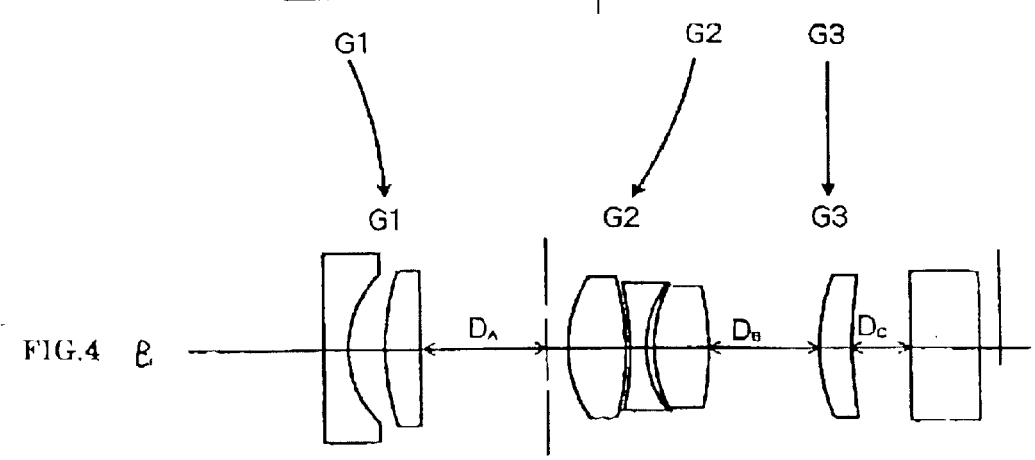
Figure 4:
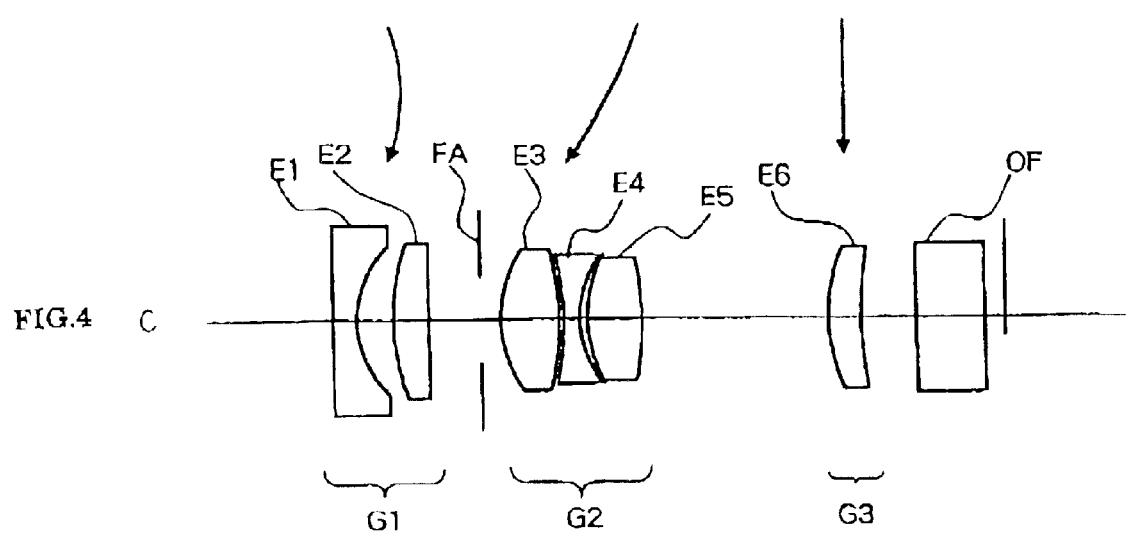
Figure 5:
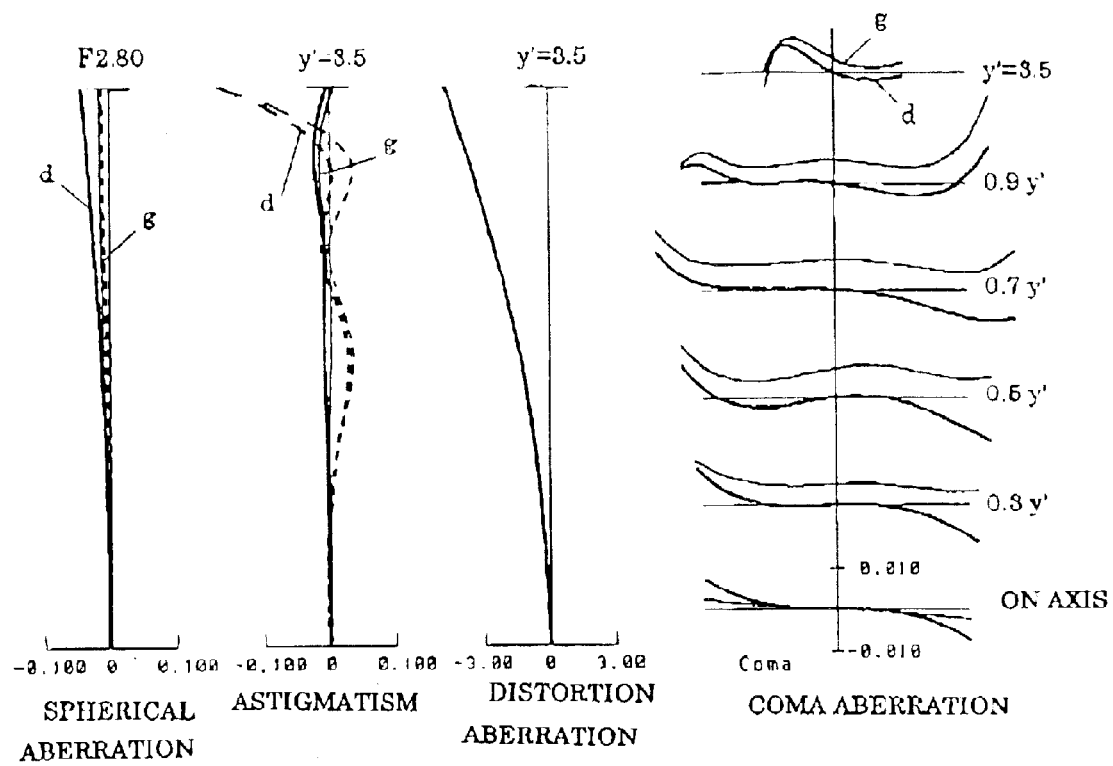
FIG. 5 is an aberration curve diameter showing spherical aberration, astigmatism, distortion aberration, and frame aberration at the short focal end of the zoom lens according to the first embodiment of the present invention shown in FIG. 1.
Figure 6:
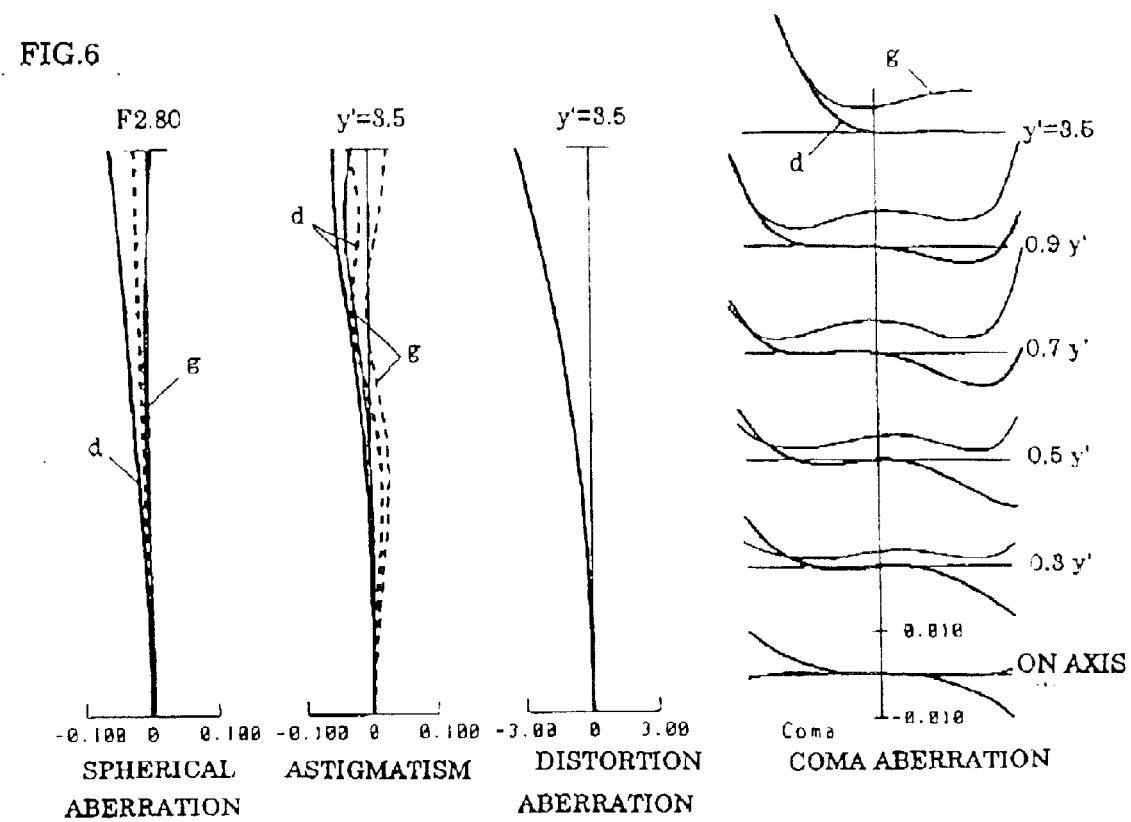
FIG. 6 is an aberration curve diameter showing spherical aberration, astigmatism, distortion aberration, and frame aberration in middle focal length of the zoom lens according to the first embodiment of the present invention shown in FIG. 1.
Figure 9:
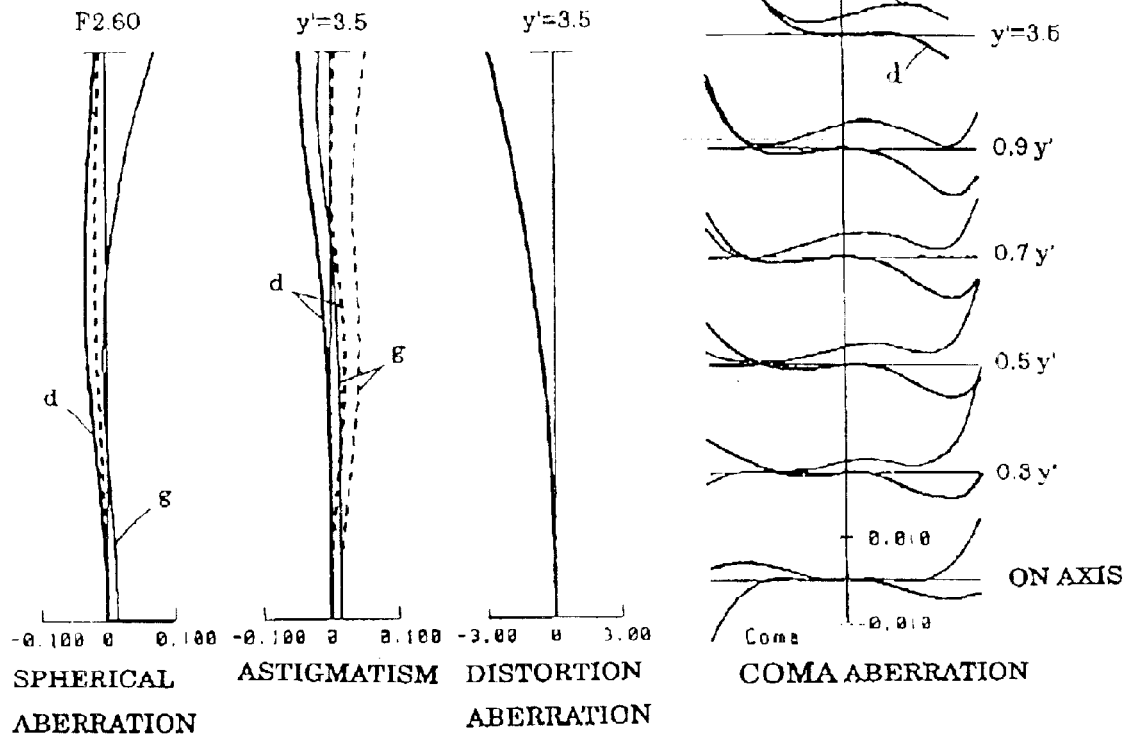
FIG. 9 is an aberration curve diameter showing spherical aberration, astigmatism, distortion aberration, and frame aberration in middle focal length of the zoom lens according to the second embodiment of the present invention shown in FIG. 2.
Figure 10:
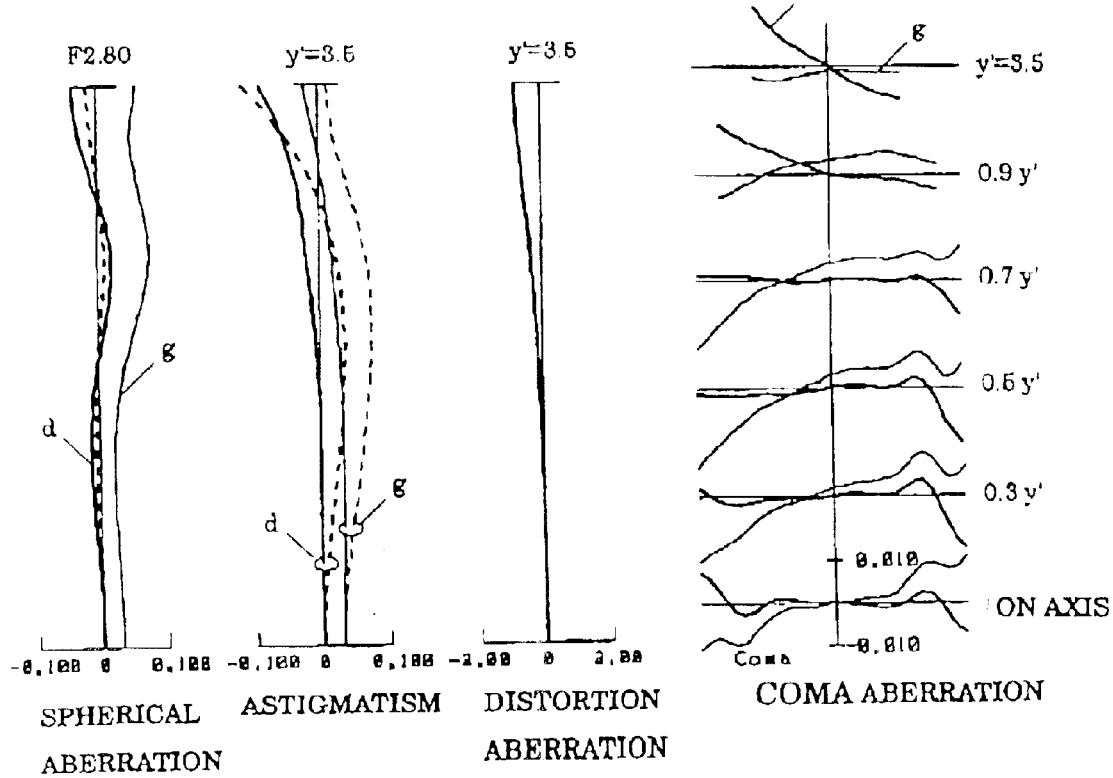
FIG. 10 is an aberration curve diameter showing spherical aberration, astigmatism, distortion aberration, and frame aberration at the long focal end of the zoom lens according to the second embodiment of the present invention shown in FIG. 2.
Figure 11:
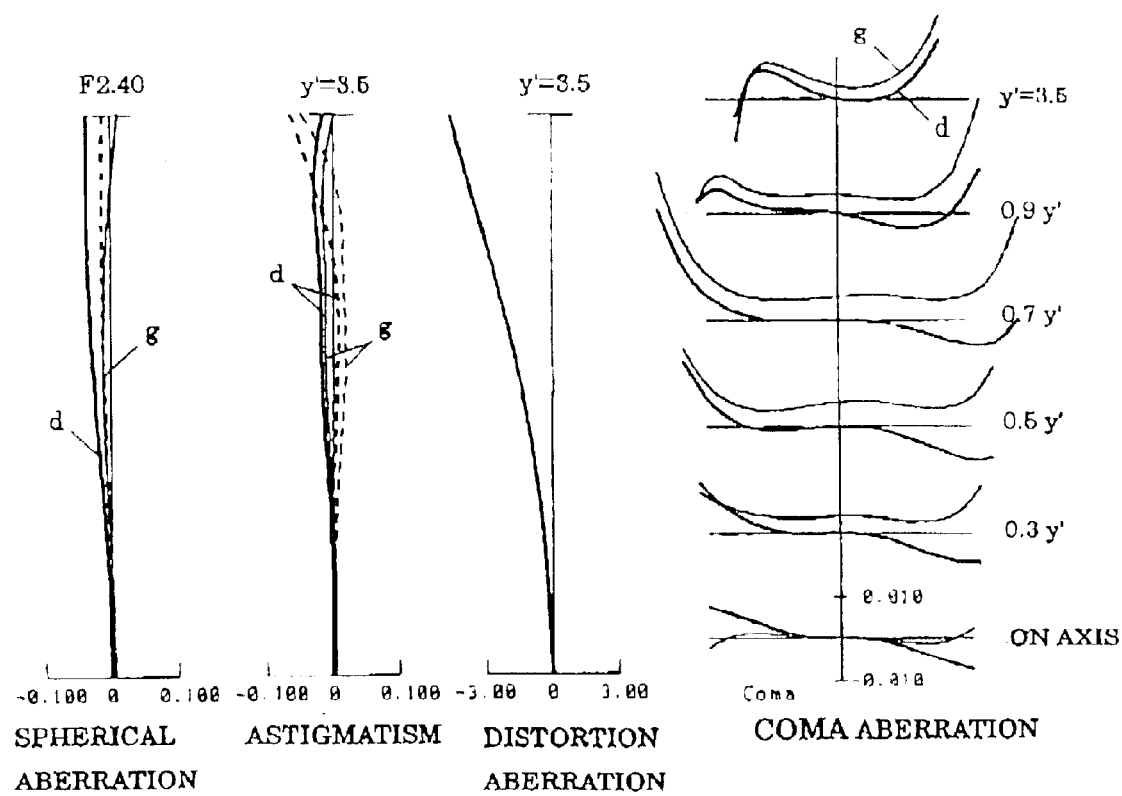
FIG. 11 is an aberration curve diameter showing spherical aberration, astigmatism, distortion aberration, and frame aberration at the short focal end of the zoom lens according to the third embodiment of the present invention shown in FIG. 3.
Figure 12:
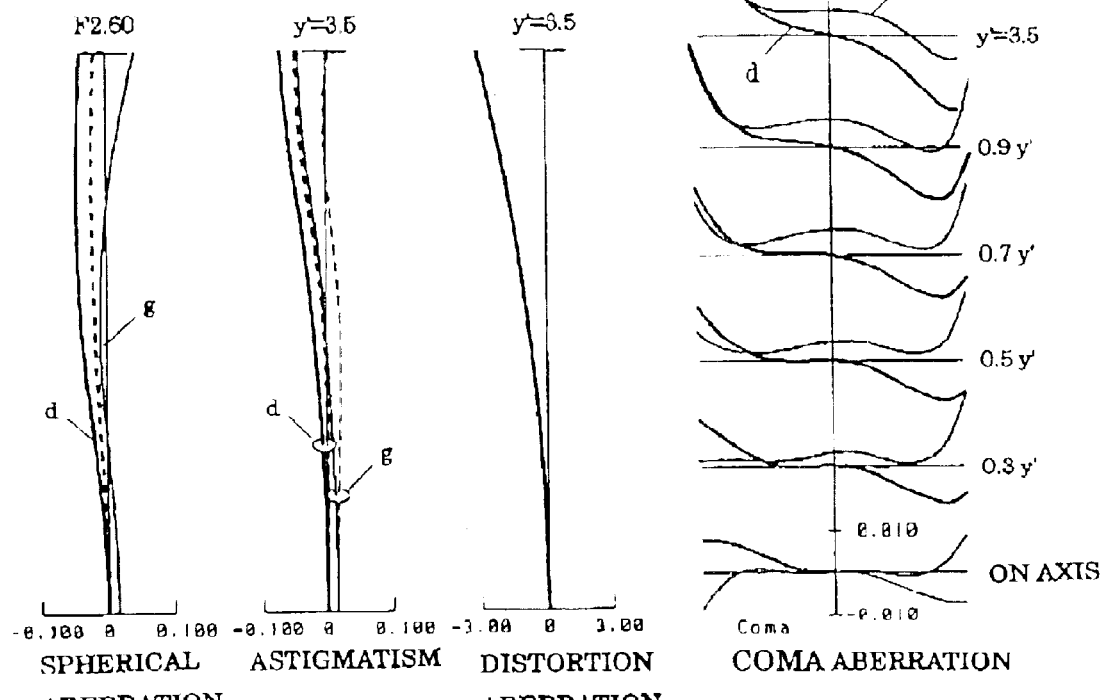
FIG. 12 is an aberration curve diameter showing spherical aberration, astigmatism, distortion aberration, and frame aberration in middle focal length of the zoom lens according to the third embodiment of the present invention shown in FIG. 3.
Figure 13:
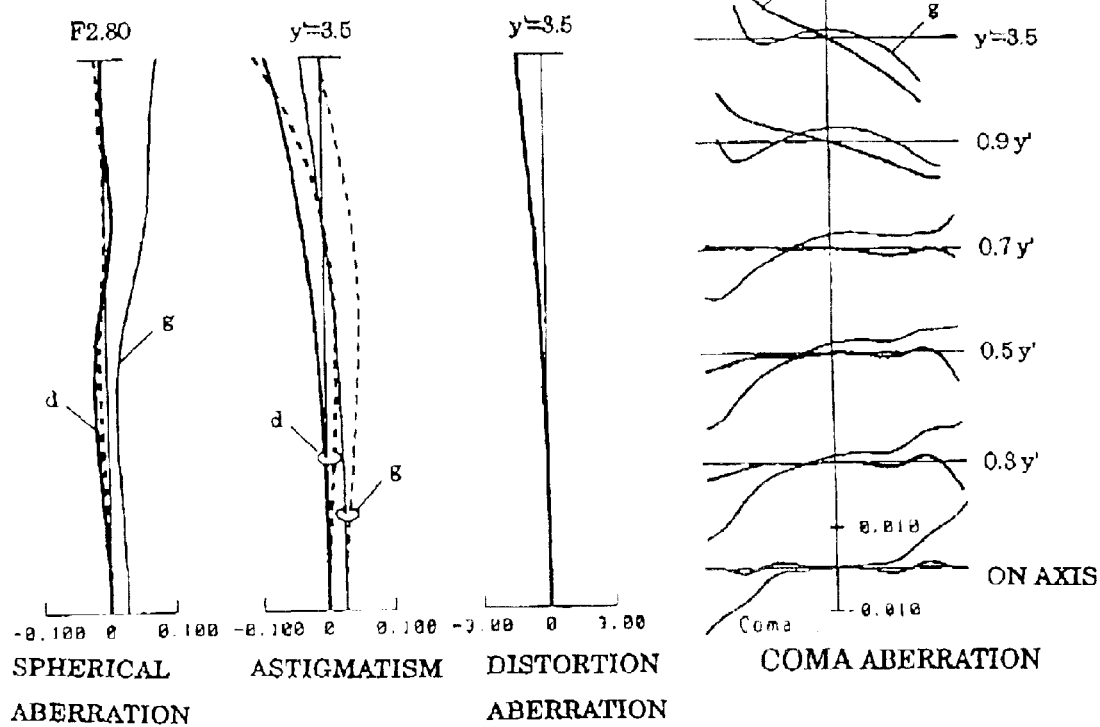
FIG. 13 is an aberration curve diameter showing spherical aberration, astigmatism, distortion aberration, and frame aberration at the long focal end of the zoom lens according to the third embodiment of the present invention shown in FIG. 3.
Figure 14:
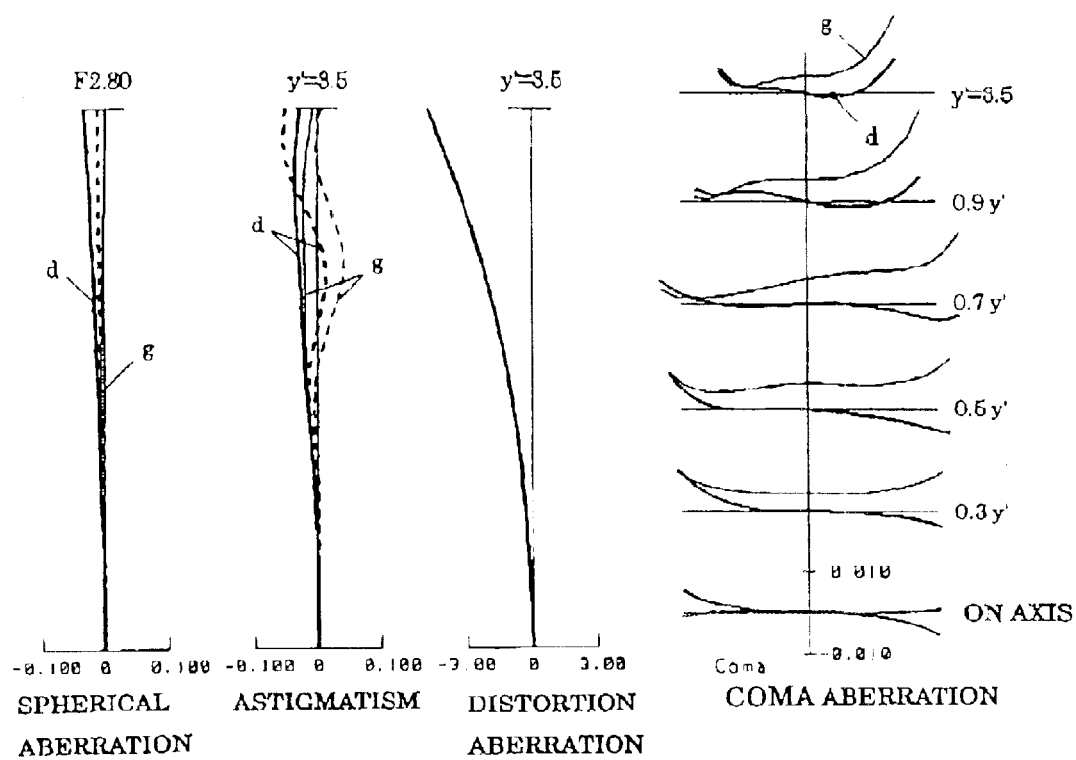
FIG. 14 is an aberration curve diameter showing spherical aberration, astigmatism, distortion aberration, and frame aberration at the short focal end of the zoom lens according to the fourth embodiment of the present invention shown in FIG. 4.

A zoom lens shown in FIG. 4 comprises a first lens E1, a second lens E2, a third lens E3, a fourth lens E4, a fifth lens E5, a sixth lens E6, an aperture stop FA, and an optical filter OF. In this case, the first lens E1 and second lens E2 configure a first group optical system G1; the third lens E3 to fifth lens E5 configure a second group optical system G2; and the sixth lens E6 configures a third group optical system G3.

In the drawing, optical surfaces are designated by numbers of their corresponding face. As described above, reference numerals in FIG. 4 are used independently of another embodiment.

In FIG. 4 as well, for example, the first lens E1, second lens E2, aperture stop FA, third lend E3, fourth lens E4, fifth lens E5, sixth lens E6, and optical filter OF are sequentially arranged in this order from an object side of an object to be photographed or the like, and an image is formed at the rear of the optical filter OF. The first lens E1 configuring the first group optical system G1 is a negative meniscus lens formed on the object side in a protrusive manner; and the second lens E2 is a positive meniscus lens formed on the object side in a protrusive manner, which exhibits a negative focal length as a whole. The third lens E3 configuring the second group-optical system G2 is a positive lens (double-convex lens); the fourth lens E4 is a negative lens (double-concave lens); and the fifth lens E5 is a positive lens (double-convex lens), which exhibits a positive focal length as a while. The sixth lens E6 configuring the third group optical system G3 is a positive meniscus lens having a positive focal length. The aperture stop FA disposed on the object side of the second group optical system G2 operates integrally with the second group optical system G2. During change of magnification from the short focal end to the long focal end, the second group optical system G2 monotonously moves from the image side to the object side, and the first group optical system G1 moves so as to correct displacement of an image plane position in accordance with the change of magnification.

In this fourth embodiment, the focal length "f" of entire system, F number "F", and a half-angle of view "ω" are changed by zooming in the range of "f"=5.46 to 10.28, F=2.80 to 2.80, and "ω"=33.95 to 19.18, respectively (in this case as well, as in the first embodiment, F number "F"=2.80 to 2.80, and thus, is the same value at the short focal end and at the long focal end). The characteristics of each optical surface are shown in the table below.

TABLE 7

| | Optical characteristics | | | | | |
|---|---|---|---|---|---|---|
| Face number | R | D | $N_d$ | $v_d$ | Remarks | |
| 01 | 131.264 | 1.19 | 1.80610 | 40.74 | First lens | First group |
| 02* | 4.339 | 1.79 | | | | |
| 03 | 10.025 | 1.71 | 1.84666 | 23.78 | Second lens | |
| 04 | 83.514 | Variable: $D_A$ | | | | |
| 05 | Aperture stop | 1.00 | | | | |
| 06* | 5.254 | 2.89 | 1.72342 | 37.99 | Third lens | Second lens |
| 07 | −12.832 | 0.21 | | | | |
| 08 | −10.581 | 0.80 | 1.80518 | 25.46 | Fourth lens | |
| 09 | 4.956 | 0.39 | | | | |
| 10 | 7.243 | 2.60 | 1.51680 | 64.20 | Fifth lens | |
| 11* | −10.538 | Variable: $D_B$ | | | | |
| 12* | 8.736 | 1.65 | 1.48749 | 70.44 | Sixth lens | Third lens |
| 13 | 20.340 | Variable: $D_C$ | | | | |
| 14 | ∞ | 3.25 | 1.51680 | 64.20 | Various filters | |
| 15 | ∞ | | | | | |

In Table 5, the optical surfaces of the second face, second face, eleventh face, and twelfth face marked with asterisks * on face numbers are non-spherical, and the parameters of aspherical surfaces are as follows.

Aspherical Surface: Second Face $K=0.0, A_4=-1.25158\times10^{-3}, A_6=-7.36058\times10^{-5}, A_8=4.71145\times10^{-6},$
$A_{10}=-3.52523\times10^{-7}, A_{12}=-2.48578\times10^{-8}, A_{14}=1.63867\times10^{-9},$
$A_{16}=8.60799\times10^{-11}, A_{18}=-6.99256\times10^{-12}$ Aspherical Surface: Sixth Face $K=0.0, A_4=-2.71931\times10^{-4}, A_6=-4.28856\times10^{-6}, A_8=1.39331.\times10^{-7},$
$A_{10}=-1.82447\times10^{-8}$ Aspherical Surface: Eleventh Face $K=0.0, A_4=5.27088\times10^{-4}, A_5=5.38798\times10^{-5}, A_8=-4.49466\times10^{-6},$
$A_{10}=3.84591\times10^{-7}$ Aspherical Surface: Twelfth Face $K=0.0, A_4=-2.37561\times10^{-4}, A_6=1.80259\times10^{-5}, A_8=-1.22704\times10^{-6},$
$A_{10}=4.26973\times10^{-8}$ An interval $D_A$ between the first group optical system G1 and the aperture stop FA integrated with the second group optical system G2; an interval $D_B$ between the second group optical system G2 and the third group optical system G3;

and an interval Dc between the third group optical system G3 and the optical filter OF are variable, and these variable intervals $D_A$ to $D_C$ are changed during zooming, as shown in the table below.

TABLE 8

Variable intervals

|  | Short focal end F = 5.46 | Middle focal length f = 7.49 | Long focal end f = 10.28 |
|---|---|---|---|
| $D_A$ | 10.540 | 6.070 | 2.610 |
| $D_B$ | 1.970 | 5.320 | 9.080 |
| $D_C$ | 3.488 | 2.941 | 2.662 |

In addition, the numeral values according to conditional formulas of the present invention, which have been described previously in this first embodiment are as follows, and are in the range of each of the conditional formulas. Numerical Values of Each Conditional Formula $F_T = 2.80$ $F_T/F_W = 1.00$ $A_W = 4.402$ $A_T = 5.980$ $A_W/A_T = 0.736$ $A_W \times 2^{(N/4)} = 6.225$ (N=3)

$L_2/Y' = 1.97$

According to the aberration curve chart of FIG. 15 and FIG. 16, it is found that aberration is well corrected or restricted in any of the zoom lenses shown in FIG. 1 to FIG. 4 according to the aforementioned first to fourth embodiments of the present invention.

(Fifth Embodiment)

Now, a fifth embodiment of the present invention which configures a camera by employing the zoom lens according to the present invention shown in the above described first to fourth embodiments will be described with reference to FIG. 17 to FIG. 19.

Here, a description is given with respect to the camera. In recent years, there has been introduced a camera in which a camera function is incorporated in a portable information terminal device such as a so-called PDA (personal data assistant) or portable cellular phone. Such a portable information terminal device includes function or configuration which is substantially identical to those of the camera, although its appearance is slightly different therefrom. The zoom lens according to the present invention may be employed for such a portable information terminal device.

Figure 17:
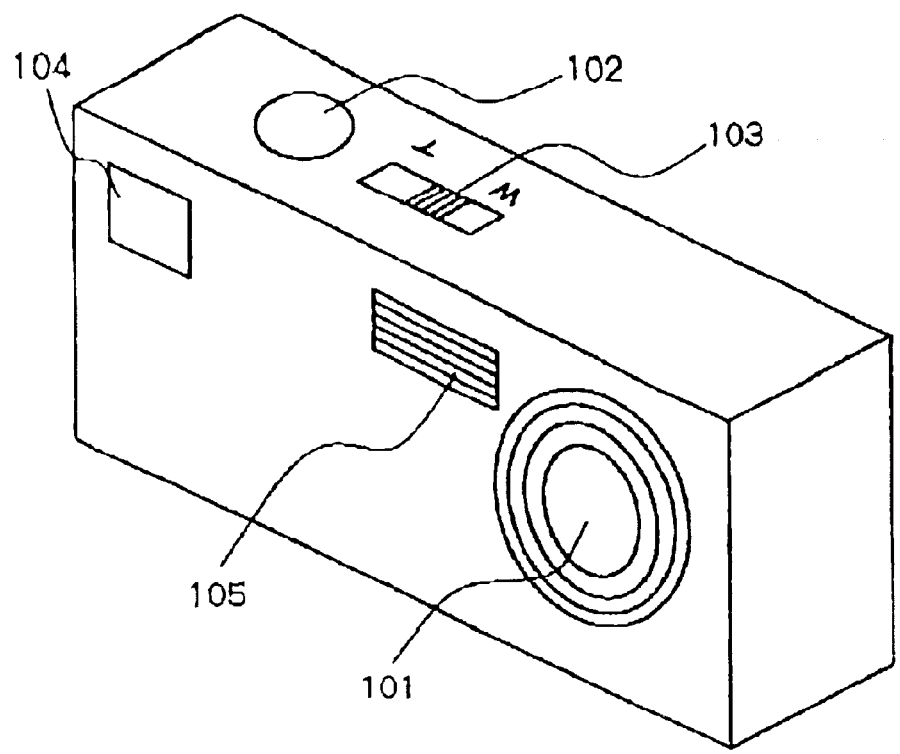
Figure 17:
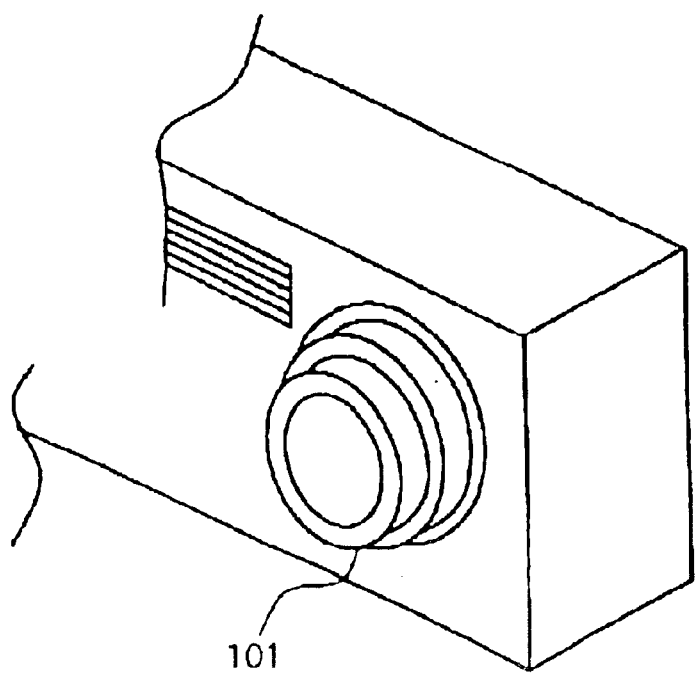
Figure 18:
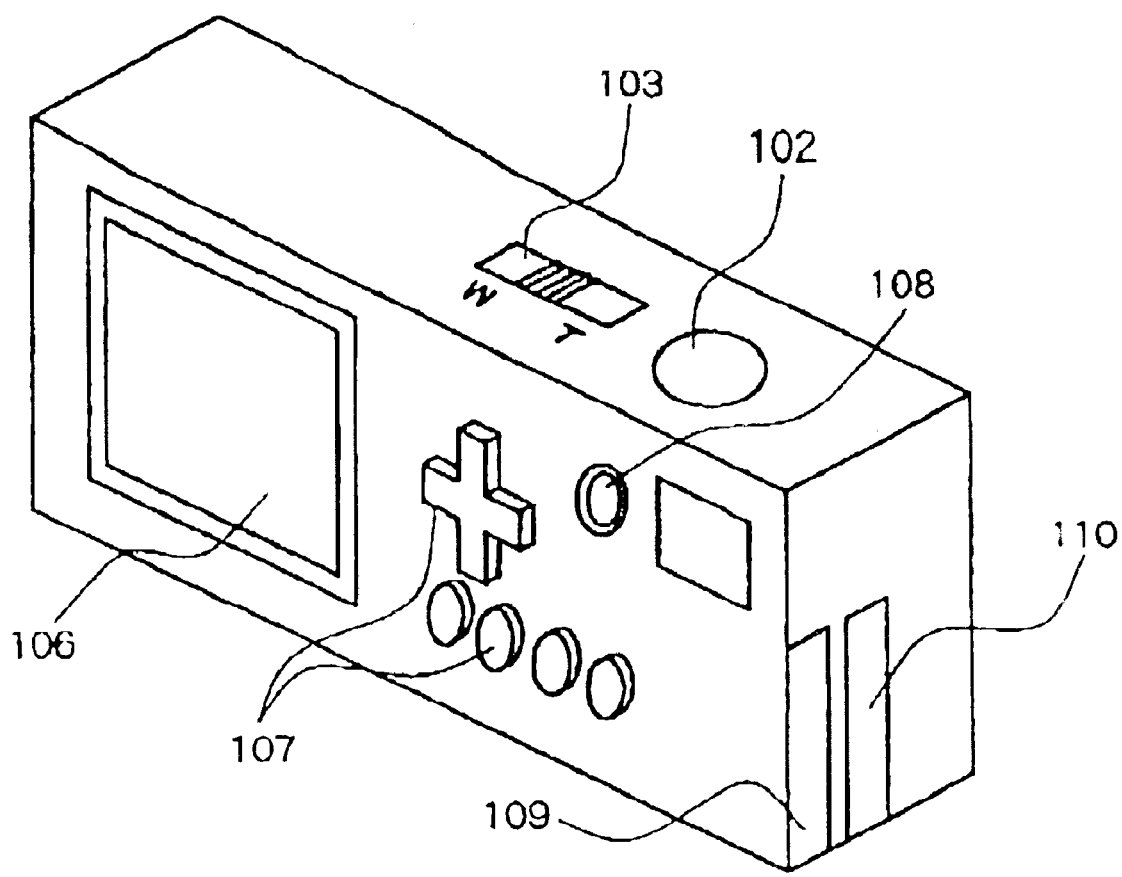
FIG. 18 is a perspective view seen from the photographer's side, for schematically showing an external construction of the camera of FIG. 17.
Figure 19:
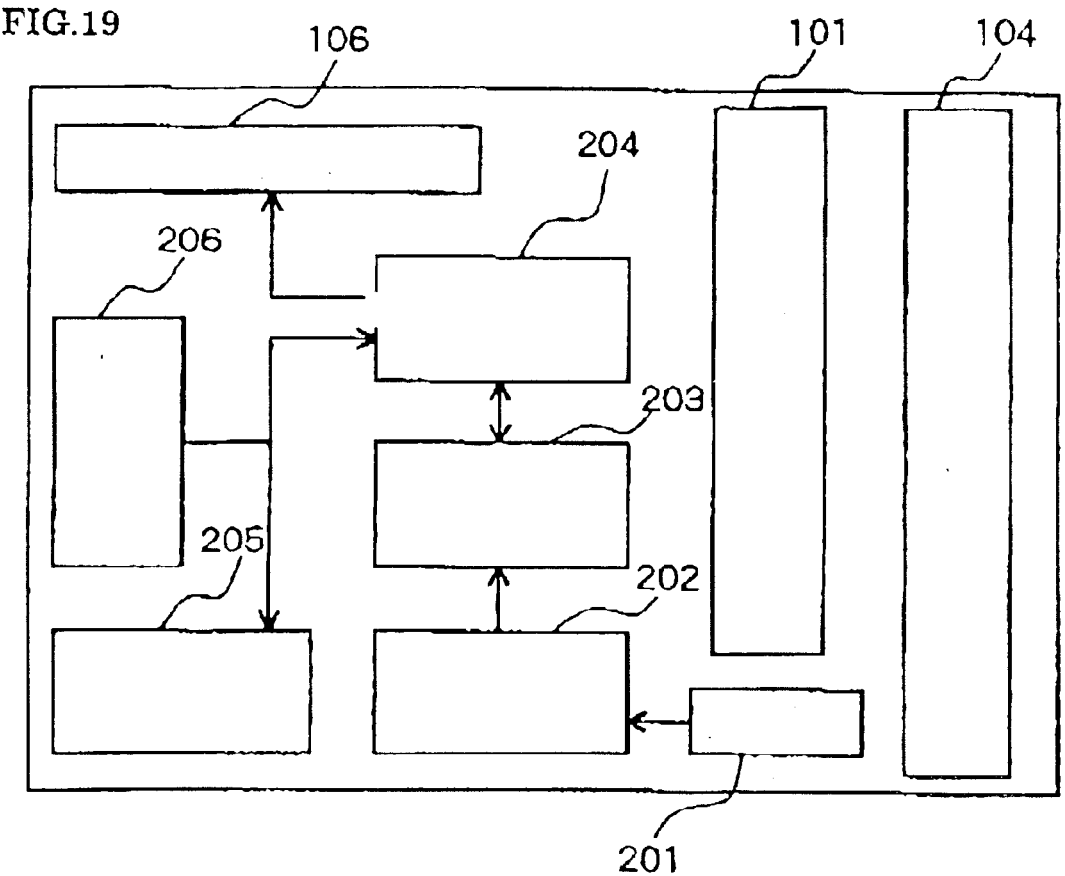
FIG. 19 is a block diagram schematically depicting a functional construction of the camera of FIG. 17.

As shown in FIG. 17 and FIG. 18, the camera comprises a photographing lens 101, a shutter button, a zoom lever 103, a finder 104, a strobe 105, a liquid crystal monitor 106, an operating button 107, a power switch 108, a memory card slot 109, a communication card slot 110 and the like. Further, as shown in FIG. 19, the camera comprises a light receiving element 201, a signal processing device 202, an image processing device 203, a central processing unit (CPU) 204, a semiconductor memory 205, a communication card 206 and the like.

The camera includes the photographing lens 101 and the light receiving element 201 serving as an area sensor such as CCD (charge coupled device) imaging device. The camera is configured so as to read by the light receiving element 201 an image of a matter targeted for photography, which is formed by the photographing lens 101 which is a photography optical system, namely, an image of an object. As this photographing lens 101, there is used a zoom lens (i.e., defined by claims 1 to 12) according to the present invention as described in the first to fourth embodiments (corresponding to claims 13 and 14).

An output of the light receiving element 201 is processed by the signal processor device 202 controlled by the central processing unit 204, and is converted into digital image information. Image information digitized by the signal processor device 202 is recorded in the semiconductor memory 205 such as a nonvolatile memory after predetermined image processing is applied in the image processor device 203 controlled by the central processing unit 204. In this case, the semiconductor memory 205 may be a memory card loaded in the memory card slot 109 or may be a semiconductor memory incorporated in a camera main body. An image in photography can be displayed on the liquid crystal monitor 106, and the image recorded in the semiconductor memory 205 can be displayed. In addition, the image recorded in the semiconductor memory 205 can be externally outputted via the communication card 206 or the like loaded in the communication card slot 110.

When the camera is carried, the photographing lens 101 is embedded in the camera body in a sunk state, as shown in FIG. 17A. When a user supplies power by operating the power switch 108, a mirror body is repeated as shown in FIG. 17B so as to provide a configuration protruded from the camera body. At this time, at the inside of the mirror body of the photographing lens 101, the optical system of each group configuring the zoom lens is disposed at a short focal end, for example. By operating the zoom lever 103, the disposition of each group optical system is changed, and an operation for changing magnification into a long focal end can be carried out. At this time, preferably, the finder 104 changes magnification together with a change in angle of view of the photographing lens 101.

In many cases, focusing is carried out by half push operation of the shutter button 102. Focusing in a zoom lens composed of a group of three negative, positive, and positive lenses as shown in the first to fourth embodiments described previously can be carried out by movement of the first group optical system or the third group optical system, or movement of the light receiving element. When the shutter button 102 is further pushed to be in a fully pushed state, photography is carried out. Then, processing is carried out as described above.

When the image recorded in the semiconductor memory 205 is displayed on the liquid crystal monitor 106, and is externally transmitted via the communication card 206 or the like, the operating button 107 is operated in a predetermined manner. The semiconductor memory 205, communication card 206 and the like are used to be loaded in dedicated or universal slots, respectively, such as the memory card slot 109 and the communication card slot 110.

In the camera or portable information terminal device as described above, as has already been described, the zoom lens as shown in the fourth embodiment can be used as a photography optical system. Therefore, it is possible to achieve a miniaturized camera or portable information terminal device with high image quality using a light receiving element in orders of 2,000,000 pixels to 4,000,000 pixels.

As has been described above, according to the present invention, there can be provided a zoom lens including: at least a first group optical system having a negative focal length and a second group optical system having a positive focal length, which are sequentially arranged in this order from an object side; and an aperture stop which moves integrally with the second group optical system, wherein, during change of magnification from a short focal end to a long focal end, the second group optical system monotonously moves from the image side to the object side, and the first group optical system moves so as to correct displacement of an image plane position in accordance with the change of magnification. There can be provided a zoom lens, camera, and portable information terminal device capable of achieving sufficient brightness even at the telephoto end, and moreover, capable of reducing a change of brightness in accordance with zooming from the wide angle end to the telephoto end, while maintaining a sufficiently small size and high performance.

What is claimed is:

1. A zoom lens comprising:
   a first group optical system having a negative focal length, and a second group optical system having a positive focal length, which are sequentially arranged from an object side;
   an aperture stop which moves integrally with the second group optical system;
   a wide angle end; and
   a telephoto end,
   wherein, during change of magnification from a short focal end to a long focal end, the second group optical system monotonously moves from an image side to the object side, and the first group optical system moves so as to correct displacement of an image plane position in accordance with the change of magnification,
   wherein the first group optical system is positioned to be the closest lens group to the object side and the second group optical system is positioned adjacent the image side of the first group optical system,
   wherein the first group optical system includes at least one positive lens and at least one negative lens, and the second group optical system includes at least two positive lenses and at least one negative lens, and
   wherein the following conditional formula is satisfied:

$$0.9 < F_T/F_W < 1.2$$

where a minimum F number at the wide angle end is $F_W$, and a minimum F number at the telephoto end is $F_T$.

2. A zoom lens comprising:
   a first group optical system having a negative focal length and a second group optical system having a positive focal length, which are sequentially arranged from an object side;
   an aperture stop which moves integrally with the second group optical system;
   a wide angle end; and
   a telephoto end,
   wherein, during change of magnification from a short focal end to a long focal end, the second group optical system monotonously moves from an image side to the object side, and the first group optical system moves so as to correct displacement of an image plane position in accordance with the change of magnification,
   wherein the first group optical system includes at least one positive lens and at least one negative lens, and the second group optical system includes at least two positive lenses and at least one negative lens, wherein the following conditional formula is satisfied:

$$0.5 < A_W/A_T < 0.9$$

where a maximum diameter of the aperture stop at the wide angle end is $A_W$, and the maximum diameter of the aperture stop at the telephoto end is $A_T$.

3. A zoom lens comprising:
   a first group optical system having a negative focal length, a second group optical system having a positive focal length, and a third group optical system having a positive focal length, which are sequentially arranged from an object side;
   an aperture stop which is disposed on the object side of the second group optical system and moves integrally with the second group optical system;
   a wide angle end; and
   a telephoto end,
   wherein, during change of magnification from a short focal end to a long focal end, the second group optical system monotonously moves from an image side to the object side, and the first group optical system moves so as to correct displacement of an image plane position in accordance with the change of magnification,
   wherein the first group optical system includes at least one positive lens and at least one negative lens, the second group optical system includes at least two positive lenses and at least one negative lens, and the third group optical system includes at least on positive lens, and
   wherein the following conditional formula is satisfied:

$$0.9 < F_T/F_W < 1.2$$

where a minimum F number at the wide angle end is $F_W$, and a minimum F number at the telephoto end is $F_T$.

4. A zoom lens comprising:
   a first group optical system having a negative focal length, a second group optical system having a positive focal length, and a third group optical system having a positive focal length, which are sequentially arranged from an object side;
   an aperture stop which is disposed on the object side of the second group optical system and moves integrally with the second group optical system;
   a wide angle end; and
   a telephoto end,
   wherein, during change of magnification from a short focal end to a long focal end, the second group optical system monotonously moves from an image side to the object side, and the first group optical system moves so as to correct displacement of an image plane position in accordance with the change of magnification,
   wherein the first group optical system includes at least one positive lens and at least one negative lens, the second group optical system includes at least two positive lenses and at least one negative lens, and the third group optical system includes at least on positive lens, and
   wherein the following conditional formula is satisfied:

$$0.5 < A_W/A_T < 0.9$$

where a maximum diameter of the aperture stop at the wide angle end is $A_W$, and a maximum diameter of the aperture stop at the telephoto end is $A_T$.

5. A zoom lens comprising:

a first group optical system having a negative focal length, a second group optical system having a positive focal length, and a third group optical system having a positive focal length, which are sequentially arranged from an object side;

an aperture stop which is disposed on the object side of the second group optical system and moves integrally with the second group optical system;

a wide angle end; and a telephoto end, wherein, during change of magnification from a short focal end to a long focal end, the second group optical system monotonously moves from an image side to the object side, and the first group optical system moves so as to correct displacement of an image plane position in accordance with the change of magnification, wherein the first group optical system includes at least one positive lens and at least one negative lens, the second group optical system includes at least two positive lenses and at least one negative lens, and the third group optical system includes at least one positive lens, and wherein the following conditional formulas are satisfied:

$$2.0 < F_T < 3.0,$$

$$0.9 < F_T/F_W < 1.2, \text{ and}$$

$$0.5 < A_W/A_T < 0.9$$

where a minimum F number at the wide angle end is $F_W$ a minimum F number at the telephoto end is $F_T$, a maximum diameter of the aperture stop at the wide angle end is $A_W$, and a maximum diameter of the aperture stop at the telephoto end is $A_T$.

6. The zoom lens according to any one of claims 1 to 4, wherein the following conditional formula is satisfied:

$$2.0 F_T < 3.0$$

where a minimum F number at the telephoto end is $F_T$.

7. The zoom lens according to any one of claims 1 to 5 wherein, during change of magnification from a short focal end to a long short focal end, a maximum diameter of the aperture stop continuously changes.

8. The zoom lens according to any one of claims 1 to 5, wherein, during change of magnification from a short focal end to a long focal end, a maximum diameter of the aperture stop changes in a stepwise manner, and the following conditional formula is satisfied:

$$A_W \times 2^{(N/4)} > A_T$$

where a maximum diameter of the aperture stop at the wide angle end is $A_W$, a maximum diameter of the aperture stop at the telephoto end is $A_T$, and the number of steps in the maximum diameter of the aperture stop is N.

9. The zoom lens according to any one of claims 3 to 5, wherein the first group optical system, the second group optical system, and the third group optical system each contain at least one aspherical surface.

10. The zoom lens according to any one of claims 1 to 5, wherein the second group system contains at least two aspherical surfaces and the following conditional formula is satisfied:

$$1.5 < L_2/Y' < 2.5$$

where a thickness relevant to an optical axis direction of the second group optical system is $L_2$, and a maximum image height is Y'.

11. The zoom lens according to any one of claims 1 to 5, wherein an optical surface positioned to be the closest to the object side in the second group optical system and an optical surface positioned to be the closest to the image side in the second group optical system are aspherical.

12. A camera comprising the zoom lens according to any one of claims 1 to 5 as a photography optical system.

13. A portable information terminal device comprising the zoom lens according to any one of claims 1 to 5 as a photography optical system of a camera function section.

14. The zoom lens according to claim 1 or 2, wherein the first group optical system and the second group optical system each contain at least one aspherical surface.

15. The zoom lens according to claim 2, wherein the first group optical system is positioned to be the closest lens group to the object side and the second group optical system is positioned adjacent the image side of the first group optical system.

* * * * *